United States Patent
Frohwein et al.

(10) Patent No.: US 11,461,839 B2
(45) Date of Patent: Oct. 4, 2022

(54) APPARATUS TO PROVIDE LIQUID FUNDS IN THE ONLINE AUCTION ENVIRONMENT

(71) Applicant: AMERICAN EXPRESS KABBAGE INC., Atlanta, GA (US)

(72) Inventors: Robert Frohwein, Atlanta, GA (US); Kathryn Petralia, Atlanta, GA (US)

(73) Assignee: AMERICAN EXPRESS KABBAGE INC., Atlanta, GA (US)

( * ) Notice: Subject to any disclaimer, the term of this patent is extended or adjusted under 35 U.S.C. 154(b) by 0 days.

(21) Appl. No.: 16/708,345

(22) Filed: Dec. 9, 2019

(65) Prior Publication Data
US 2020/0286165 A1 Sep. 10, 2020

Related U.S. Application Data

(63) Continuation of application No. 13/185,429, filed on Jul. 18, 2011, now Pat. No. 10,540,713, which is a continuation-in-part of application No. 12/436,642, filed on May 6, 2009, now Pat. No. 7,983,951.

(60) Provisional application No. 61/156,865, filed on Mar. 2, 2009, provisional application No. 61/475,651, filed on Apr. 14, 2011, provisional application No. 61/481,698, filed on May 2, 2011, provisional application No. 61/485,119, filed on May 11, 2011, (Continued)

(51) Int. Cl.
*G06Q 30/00* (2012.01)
*G06Q 40/02* (2012.01)
*G06Q 20/10* (2012.01)
*G06Q 20/40* (2012.01)
*G06Q 30/02* (2012.01)
*G06Q 40/08* (2012.01)

(52) U.S. Cl.
CPC .......... *G06Q 40/02* (2013.01); *G06Q 20/102* (2013.01); *G06Q 20/108* (2013.01); *G06Q 20/40* (2013.01); *G06Q 30/0207* (2013.01); *G06Q 30/0215* (2013.01); *G06Q 40/025* (2013.01); *G06Q 40/08* (2013.01)

(58) Field of Classification Search
None
See application file for complete search history.

(56) References Cited

U.S. PATENT DOCUMENTS

| | | | |
|---|---|---|---|
| 2004/0015438 A1* | 1/2004 | Compiano | G06Q 40/02 705/40 |
| 2006/0015421 A1* | 1/2006 | Grimberg | G06Q 40/04 705/35 |

(Continued)

*Primary Examiner* — Mila Airapetian

(57) ABSTRACT

A method, apparatus, and computer readable storage to implement a lending or cash advance system that can be (but is not required to be) integrated with an online commerce site. Sellers on the online commerce site can click a button or tab in their web browser that is visiting the online commerce site and information known to the online commerce site is automatically shared with a potential cash provider. The information can include sales data related to the seller's business on the online commerce site that can be applied to a formula used by a cash provider to evaluate the risk associated with lending the seller cash. A financial account used by the seller can rapidly receive the cash loan (if approved) and payments received by the seller from buyers would go into this financial account which is then used to automatically pay the cash provider back at agreed upon terms.

18 Claims, 26 Drawing Sheets

Related U.S. Application Data provisional application No. 61/500,118, filed on Jun. 22, 2011.

(56) References Cited

U.S. PATENT DOCUMENTS

| | | | | |
|---|---|---|---|---|
| 2006/0047600 A1* | 3/2006 | Bodenheim | .......... | G06Q 20/102 705/40 |
| 2007/0016518 A1* | 1/2007 | Atkinson | ................ | G06Q 40/02 705/38 |
| 2007/0244779 A1* | 10/2007 | Wolff | ..................... | G06Q 40/00 705/35 |
| 2008/0033825 A1* | 2/2008 | Goldin | ............... | G06Q 30/0219 705/14.21 |
| 2008/0319921 A1* | 12/2008 | Stigzelius | .............. | G06Q 40/06 705/36 R |

* cited by examiner

Please enter your account information for:

1400

☒ FACEBOOK
USERNAME: MRBLONDE
PASSWORD: *********

☒ ONLINE BANKING
BANK NAME: TD BANK ▽
USERNAME: 102343229953
PASSWORD: ********

☐ LINKEDIN
USERNAME:
PASSWORD:

APPARATUS TO PROVIDE LIQUID FUNDS IN THE ONLINE AUCTION ENVIRONMENT

CROSS REFERENCE TO RELATED APPLICATIONS

This application is a continuation in part application of application Ser. No. 12/436,642, entitled, "Apparatus to Provide Liquid Funds in the Online Auction and Marketplace Environment", filed in the USPTO on May 6, 2009, which claims benefit to U.S. Provisional application 61/156,865, filed in the USPTO on Mar. 2, 2009, both applications of which are incorporated by reference herein in their entireties. This application also claims benefit to U.S. provisional application 61/475,651, filed on Apr. 14, 2011, entitled, "Method and Apparatus to Evaluate and Provide Funds in Online Environments" which is incorporated by reference herein in its entirety. This application also claims benefit to U.S. provisional application 61/481,698, filed on May 2, 2011, entitled, "Method and Apparatus to Evaluate and Provide Funds in Online Environments" which is incorporated by reference herein in its entirety. This application also claims benefit to U.S. provisional application 61/483,735, filed on May 8, 2011, entitled, "Method and Apparatus to Evaluate and Provide Funds in Online Environments" which is incorporated by reference herein in its entirety. This application also claims benefit to U.S. provisional application 61/485,119, filed on May 11, 2011, entitled, "Method and Apparatus to Evaluate and Provide Funds in Online Environments" which is incorporated by reference herein in its entirety. This application also claims benefit to U.S. provisional application 61/500,118, filed on Jun. 22, 2011, which is incorporated by reference herein in its entirety. U.S. application Ser. No. 13/185,429 is also incorporated by reference herein in its entirety. U.S. application Ser. No. 12/436,642 is also incorporated. by reference herein in its entirety.

BACKGROUND OF THE INVENTION

Field of the Invention

The present inventive concept relates to a system, method, and computer readable storage that provides a seller that leverages an online commerce site a mechanism to receive cash using a variety of paradigms to evaluate the transaction and receive repayment from the seller.

Description of the Related Art

Sellers of physical items using brick and mortar approaches (not online) have a variety of mechanisms at their disposal to receive a cash advance or loan. For example, a seller of widgets may receive a loan or cash advance subject to a credit or other approval which would consider the assets, prospects and history of the business. Getting cash in these forms can mean the difference for a company between staying in business or going out of business as the company may have immediate liabilities it needs to address (e.g., rent, etc.). It can dramatically increase a business' ability to grow.

Online commerce sites (such as EBAY, AMAZON) allow users to buy and sell goods right from their computer, mobile or other device using a web browser or application. There are also technologies that enable merchants to launch their own store online. There has never been an easy way for a merchant who sells products or services online to receive a loan or cash advance either partially or wholly based on data related to their online sales.

Therefore, what is needed is a mechanism by which a merchant selling goods or services online seller using an online commerce site (of a third party or their own) can request and receive a cash advance or loan. There is also a need for a merchant (typically online but also offline) to proactively provide additional information about the seller's business or access to repayment sources to enable the cash provider or lender to quickly increase the amount of cash available to the seller and/or provide the seller with better rates upon which to take the loan or cash advance.

SUMMARY OF THE INVENTION

It is an aspect of the present general inventive concept to provide an improved funding system for merchants that sell goods or services online via third party or their own commerce web sites.

The above aspects can be obtained by a system that includes (a) receiving mandatory information about a user and storing the mandatory information in an electronic computer database; (b) allowing a user to choose whether to enter optional information about the user, and upon receiving the optional information, storing the optional personal information in the electronic computer database; (c) computing a score using the mandatory information and optional information if provided; and (d) determining whether to approve a transfer of funds using the score, and upon approval initiating an electronic transfer of funds from a cash server to an account associated with the user, (e) wherein upon the user entering the optional information the user receives an incentive.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which:

FIG. 14 is a window allowing a user to enter login information for a number of web sites with relevant information;

FIGS. 18-26 are screenshots of an example of the "profile building" embodiment, according to an embodiment.

Reference will now be made in detail to the presently preferred embodiments of the invention, examples of which are illustrated in the accompanying drawings, wherein like reference numerals refer to like elements throughout.

Figure 1:
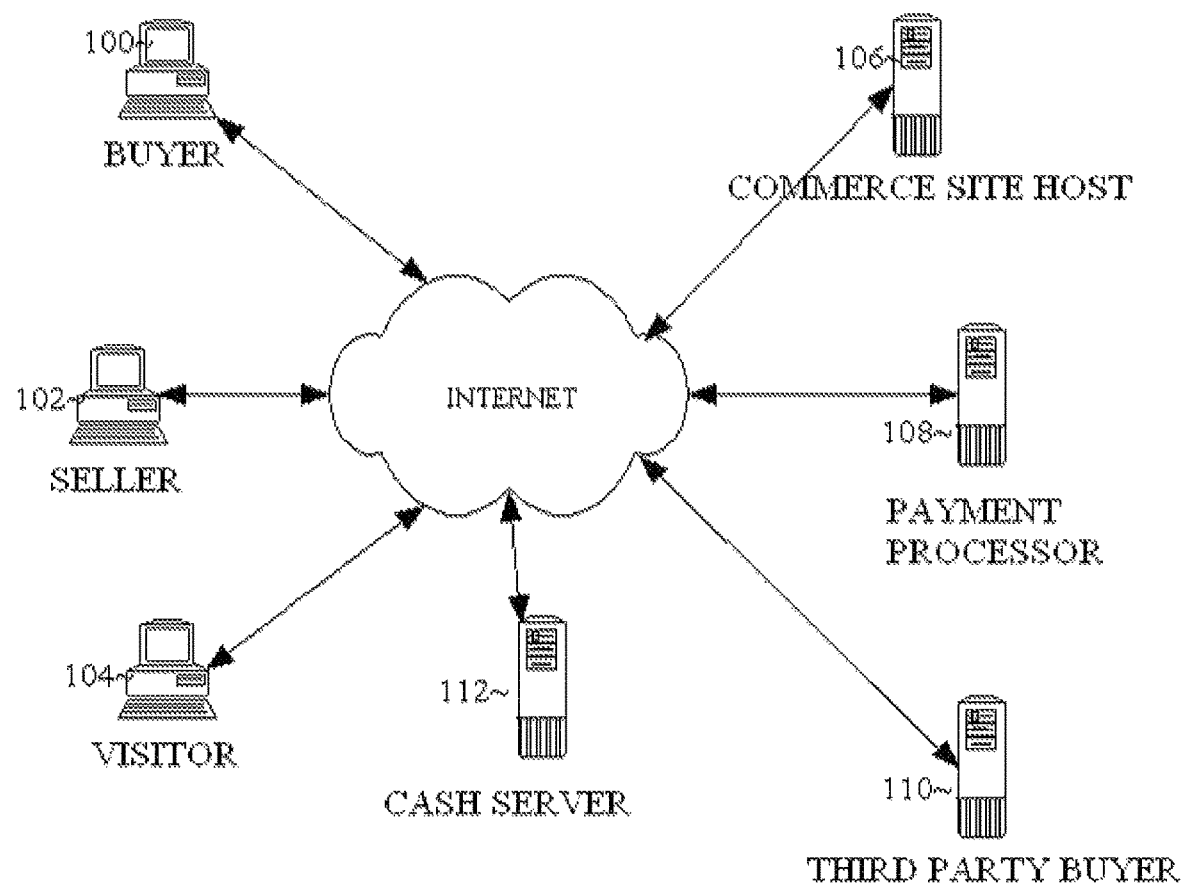
FIG. 1 is a block diagram illustrating components of an online sales system, according to an embodiment.

Inventive concepts described herein can be used in conjunction with electronic auction, online marketplace and standalone web systems, including those described in U.S. patent application Ser. Nos. 11/776,059; 11/646,934; and 11/167,999, all three of these applications are incorporated by reference in their entireties.

A traditional loan is where a borrower borrows funds from a lender in exchange for repayment of those funds with interest to compensate the borrower for the loan and risk involved if the borrower defaults.

An advance is where a seller receives funds from an advance provider in exchange for the purchase of receivables, which can be either currently owed to the seller by one or more third parties or can be future receivables which can represent the expectation of future sales by the seller. Payments received from these receivables are then applied to paying off the advance. Payments from receivables can be used from all receivables of the seller and not limited to particular accounts of the seller. Once the advanced amount is fully paid by the seller then all receivables once again become the property of the seller (unless a further advance is made).

Following a purchase from the seller, the advance provider either takes direct control of the receivables and receives direct payments from the seller's customers of the purchased receivables, or the advance provider collects the proceeds from the seller. Therefore, the advance provider is depending on the first party's customers to continue to purchase (or consummate, in some instances) and fulfill payment for the transaction with the first party. If the customers do not purchase the expected amount of goods from the seller or do not pay for them, the cash provider would have to either (depending on the agreement between the seller and the cash provider) 1) take the loss, or 2) hold the seller (or a principle of the first party) liable for any payment of deficiency from the receivables. It is also possible that payments from the customers of sellers are split in some predetermined or other manner, with some of these payments going directly to the cash provider and the balance going to the seller.

A merchant account advance is an advance by an advancing party that uses a seller's merchant account in order to receive payments by the seller for the amount advanced. For example, a seller uses their merchant account to receive payments by credit card (e.g., VISA, MASTERCARD). Once payments are processed the amounts go directly into the seller's merchant account. When a merchant account advance (or "merchant cash advance") is made, when a payment is processed, instead of it going directly into the seller's account the payment may go directly into an account of the advancing party. There are alternative ways to implement merchant cash advance, including a simple advance against future receivables, but when these receivables are received they still go into the existing payment account.

Factoring is similar to the advance (described above) but a factor typically provides cash to a seller based only on particular accounts of the seller's receivables (either past amounts owed, amounts currently due or future sales to particular parties). Thus, only the receivables for these particular accounts (which will be agreed upon beforehand by both parties) will be used to satisfy the advanced amount and pay back the factor. The Factor can also use the seller's merchant account to receive payment as discussed above. Thus, a factoring arrangement can be considered a type of advance, although some may simply refer to it as a purchase and sale arrangement. As used herein, "advance" also includes a factoring agreement.

A lender, advance provider, factor, and any other party that would transfer money to a seller with the expectation of receiving more than the amount provided to the party receiving the cash can all be generally referred to herein as a "cash provider." The cash provider would typically analyze data related to online sales of the seller and facilitate repayment from one or more sources in order to conclude that the risk of making (or increasing) the loan or advance (or decreasing the rate) is acceptable. All features described herein can be applied to any type of cash provider. As used herein, references to sellers and merchants are interchangeable.

An example will be presented to illustrate the concept of factoring, but of course this is just an example and is not applicable to all situations. Suppose company A sells computers to customers X, Y and Z. Company A pays $100 for each computer and sells them for $200 each. Each of customers X, Y and Z purchases on average 5 computers per month, which comes to $3,000 gross receivables or $1,500 in profit per month. On January 1, company A needs cash and cannot wait for the computers to be sold. So company A sells the next $1,000 of gross receivables for clients X and Y (but not Z) to a cash provider (factor). The cash provider pays immediately pays company $900 for the $1,000 (a 10% discount). When $1,000 in payments comes in to company A from X and Y these payments go to the cash provider. If these payments do not come in from X and Y then the cash provider (in this example) would not be able to obtain payment from company A. Therefore, before agreeing to buy company A's receivables, the cash provider would typically investigate the financial status of X and Y and their purchasing habits (e.g., whether they always purchase their computers from company A; whether they are obligated by contract to purchase from company A and whether companies X and Y are financially sound). When payments come in from X and Y, the cash provider may have arranged with company A to allow the buyer direct access to company A's business banking or merchant processing account, so that when the money comes in, the cash provider can immediately obtain and/or transfer these funds to the buyer's own bank account before company A can divert these funds. Company A can thus purchase the accounts X and Y from company A at a discount, but the cash provider is not technically purchasing against all receivables from company A. In other words, the cash provider is not purchasing all receivables by company A but only against certain accounts from particular clients of company A. If Z makes purchases from A, if the Z account was not part of the factoring agreement between company A and buyer, then the cash provider cannot attach funds from the Z account.

In another example related to the above example, instead of the limiting the accounts to X and Y, a cash provider (an advance provider) can advance cash to the seller for all of the seller's clients/accounts (which would include X, Y, and Z), and receivables from all of these clients/accounts would then go to satisfy the advanced amount. For purposes of this discussion, this would be considered an "advance" instead of "factoring" since all of the receivables are used to satisfy the advanced amount. Thus, in the above example, customer Z of company A could be used (unlike the factoring example) to satisfy the amount owed to the cash provider. In fact, all accounts/receivables could/would be used to satisfy any cash advance made by a cash provider. Thus, whenever company A receives cash in their account, it would be applied towards paying off the cash advance amount to the cash provider. The cash provider and seller would typically agree to terms of repayment (e.g., instead of taking all cash received by the company as soon as it comes in, they might take for example $500 per month on the first day of each month to satisfy a $1,000 cash advance).

FIG. 1 is a block diagram illustrating components of an online sales system, according to an embodiment.

A buyer 100 uses an online commerce site 106 (e.g., EBAY, AMAZON.COM, etc.) to purchase items (such as computers, etc.) from a seller 102 using a payment processor 108. This can be done as known in the art and described in all of the patent documents that are referred to herein. Visitors (such as visitor 104) can visit the commerce site 106 and browse items for sale by sellers and take on the role of buyer if the visitor 104 wishes to purchase from any seller.

The seller 102 desires to receive cash (which can be in the form of a traditional loan, factoring, an advance, or other arrangement) from cash server 112. The cash server 112 is operated and maintained by an entity which serves as the cash provider, and when cash server 112 is used herein it can refer to both the actual server processing the transaction as well as the party acting as the cash provider. The cash server 112 can process a request for cash (using any type of arrangement) and can instantly and automatically process the cash transaction. The cash server 112 may evaluate a variety of information regarding the seller including the seller's financial accounts, receivables, client accounts and respective clients, and/or all other relevant data to make a determination that providing cash to the seller is a good decision (more on this will be discussed herein) and what amount of cash would be appropriate. This can be set up as a line of cash from which a seller can draw funds. "Cash" as used herein can refer to placing funds into an account of or associated with the seller (which can then be withdrawn by the seller in the form of cash or used in whatever manner the seller wishes). Typically the cash server 112 would provide to the seller 102 a cash amount with such terms so that the cash provider would expect to make a profit from the transaction (and also to offset the risk involved with providing cash to the seller and other sellers).

The cash server 112 can administer cash requests from seller 102 and accommodate such requests by either rejecting requests that are not approved or accepting such requests and arranging for cash (liquid funds) to be delivered electronically to the requesting seller. The cash server 112 can process cash requests based on at least one of the arrangements described herein (or others known in the art). If approved, cash can be delivered electronically leveraging the cash server 112 to the seller 102, such cash can either be directly funded from a party administering the cash server 112 or indirectly funded from a third party investor 110 in communication with the cash server 112.

A third party payment system (such as PAYPAL) can be used to make the transfer of cash from the cash provider to the seller. Payments back from the seller to the cash provider would (in one embodiment) use the same payment system/account (or another payment system/account of the seller) so that the seller can make payments back to the cash provider in order to pay off the amount owed to the cash provider. Thus, when the seller makes a sale and has received proceeds from that sale (in the same account that the initial cash was provided to the seller or another account of seller), the seller can then take the proceeds or other cash in the account (or a portion) automatically out of this account in order to satisfy the amount owed to the cash provider. The agreement between the cash provider and the seller (before any cash is transferred from the cash provider to the seller) could require that the seller only use a particular payment system/account (e.g., a particular PAYPAL account) when receiving proceeds from sales.

All of the methods described herein can be automatic, in that they are processed electronically and can typically be processed in real time (unless further information from a human may be needed, for example in the event of an error or unavailable information). Real time can be a matter of minutes (or less) if everything goes smoothly (since no human operator need be involved).

A third party investor 110 can be used in an embodiment in which third parties invest in transactions between the cash server 112 and sellers in order to invest. For example, the third party investor 110 could actually provide an advance (or a portion of) from the cash server 112 made between the cash server 112 and the seller 102) and receives payments from the seller against the advanced amount. The investor's money can also be put into the seller's PAYPAL (or other agreed upon account as well). The cash server 112 can request and receive all data (financial data, sales transactions, credit reports, etc.) from all relevant parties in order to process requests and find a prospective investor. More on the operations of cash server 112 will be discussed below. It is noted that whenever a credit report is retrieved for the seller to analyze the seller's credit worthiness, the credit report that is used is associated with the seller (e.g., if the seller is using a company name on online commerce site), the credit report used can be a credit report for the actual company name (e.g., a business credit report) or a personal credit report for the main proprietor operating the company trading under the company name on the online commerce site.

Figure 2:
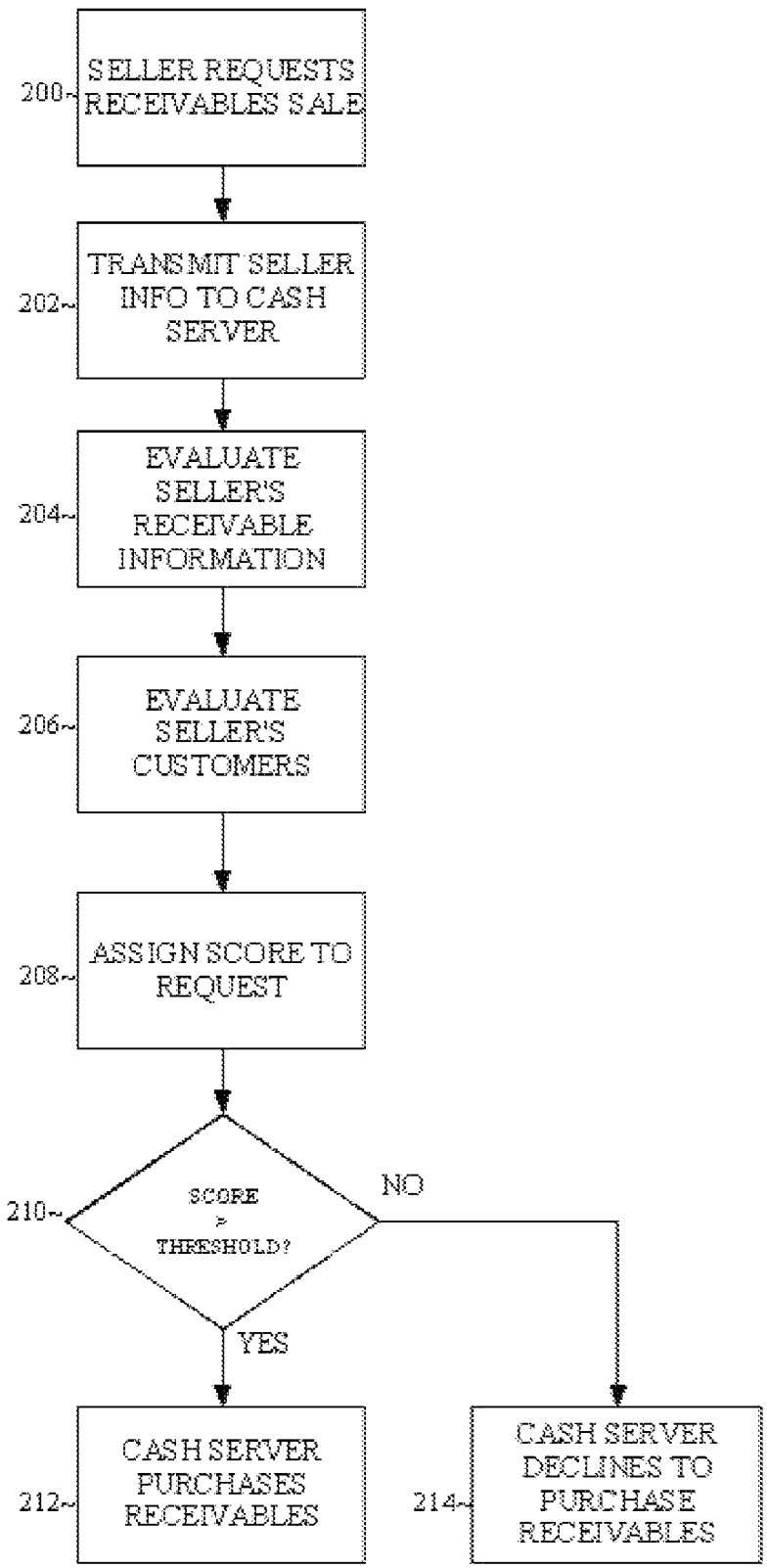
FIG. 2 is a flowchart illustrating an exemplary method of completing a factoring transaction, according to an embodiment.

FIG. 2 is a flowchart illustrating an exemplary method of completing a factoring transaction, according to an embodiment.

The method can begin with operation 200, wherein the seller requests a factoring transaction from a factor (cash provider). The seller can be any seller on an online commerce site. They seller may be required to register with an additional server (maintained by a party separate from the online commerce site) in order to be able to activate this functionality. A tab on the online commerce site can allow the seller to simply click it in order to initiate this method. In another embodiment, the seller does not have to make a request and the system would automatically make a determination as to whether the seller qualifies for a cash amount (and how much). The request may also require the seller to identify a financial transaction account that the seller uses to process its transactions (e.g. PAYPAL) so such account can be evaluated as well and used to transfer funds (to and from the seller).

From operation 200, the method proceeds to operation 202, which transmits seller information to a cash server (such as cash server 112). The cash server is ideally operating in conjunction with the online commerce site (although it may be operated by an entirely separate entity) and will analyze the requested transaction for approval or denial. The seller information is transmitted to the cash server. The seller may be required to provide the seller's account identification on the online commerce site so that the cash server can examine the seller's transaction history. The information transmitted to the cash sever can comprise the amount of the request (although in another embodiment the seller does not request a particular amount and the system determines and informs the seller how much the seller qualifies for), which designated customers (income streams) the factoring request should be evaluated against (used to satisfy the money advanced), any financial data regarding the seller, financial (and any other data) regarding the customers (so their solvency can be evaluated as well since their payments to the seller will be directed back to the cash server to satisfy the money provided by the cash server). The information transmitted can come from the online commerce site and/or third party site (such as credit reporting bureaus, etc.)

From operation 202, the method proceeds to operation 204, wherein the cash server evaluates the seller's receivables information and/or transaction history. The information evaluated can comprise the types of products being listed, the customers that are included in the request (from operation 200), the financial aspects of those customers, the amount and frequency of purchases from those customers to the seller, and/or any other relevant transaction or other data. Relevant data is data which would contribute to computing a more accurate score (in operation 208) to evaluate the relative risk of approving the transaction requested in operation 200 (similar to a credit score).

From operation 204, the method proceeds to operation 206, wherein the cash server may evaluate the seller's customers which are identified in the request (from operation 100) as being accounts that will be used to repay money that might be transferred by the cash server to the seller (in operation 212). The seller's customers can be evaluated based on their own transaction history, cash flows, money in their bank accounts, purchasing history (with the seller and with other parties), and/or if they sell goods their sales data as well. Any other relevant data about the seller's customers can be evaluated in order to evaluate the relative risk of approving the transaction requested in operation 200. In addition, other factors may be examined as well in evaluation (aside from the seller's customers).

From operation 206, the method proceeds to operation 208, wherein the cash server takes all of the relevant data acquired in operations 204 and 206 and applies a numerical formula that produces a score. Any additional information that may be relevant from any source may also be incorporated into the formula. Additional information can also be information from the financial account used by the seller which receives payments from other or all buyers (and other payments) to the seller. By examining this account (and details thereof such as all transactions), the cash flow of the seller may be determined. The payments from the designated customers can also be evaluated to see if they are adequate to meet repayment. The score can typically be a single number, although in another embodiment it can be multiple numbers (e.g., a different value for more than one category of relevant factors). For example, one example of a very simple score could be the average amount of sales the seller generates each month multiplied by a constant plus an average amount of purchases the seller's customers (buyers) make multiplied by a constant. This is just a very simple example, and all known and relevant data can be incorporated into a simple or complex formula which results in one or more numbers representing the score. Some or all data collected can also be used in calculating how much of a cash advance or loan should be provided to the seller.

From operation 208, the method proceeds to operation 210, which determines if the score computed in operation 208 is greater than a predetermined threshold requirement for approving a transaction. If the score computed in operation 208 is actually more than one number, then each of the numbers would have to be greater than a predetermined threshold in order for the transaction to be approved. In one embodiment, the score(s) would be used to determine whether or not to approve the transfer of funds to the seller for a particular amount. In another embodiment, the score(s) can be used to determine whether to approve transfer of funds and a maximum amount of funds that are approved for transfer to the seller.

If in operation 210, the score is greater than the threshold, then the method proceeds to operation 212, wherein the cash server purchases the receivables (completes the factoring transaction requested in operation 200). This also means that the cash server will initiate a cash transfer to the seller.

If it is determined in operation 210 that the score is not greater than the threshold, then the method proceeds to operation 214 wherein the cash server declines to purchase the receivables (the transaction requested in operation 200 is not approved). The seller is notified that they are ineligible for a transaction. Alternatively, the seller may be notified that he or she qualifies for a reduced amount of funds and can be given the opportunity to accept that.

FIG. 2 was directed to a request for cash in based on factoring (for particular accounts of the seller). While related, an advance (as discussed above) is different in that the funds used for repayment are not relegated to particular seller accounts but instead the cash server would be potentially paid from all cash funds received by the seller, regardless of which individual accounts/purchasers from the seller.

Figure 3:
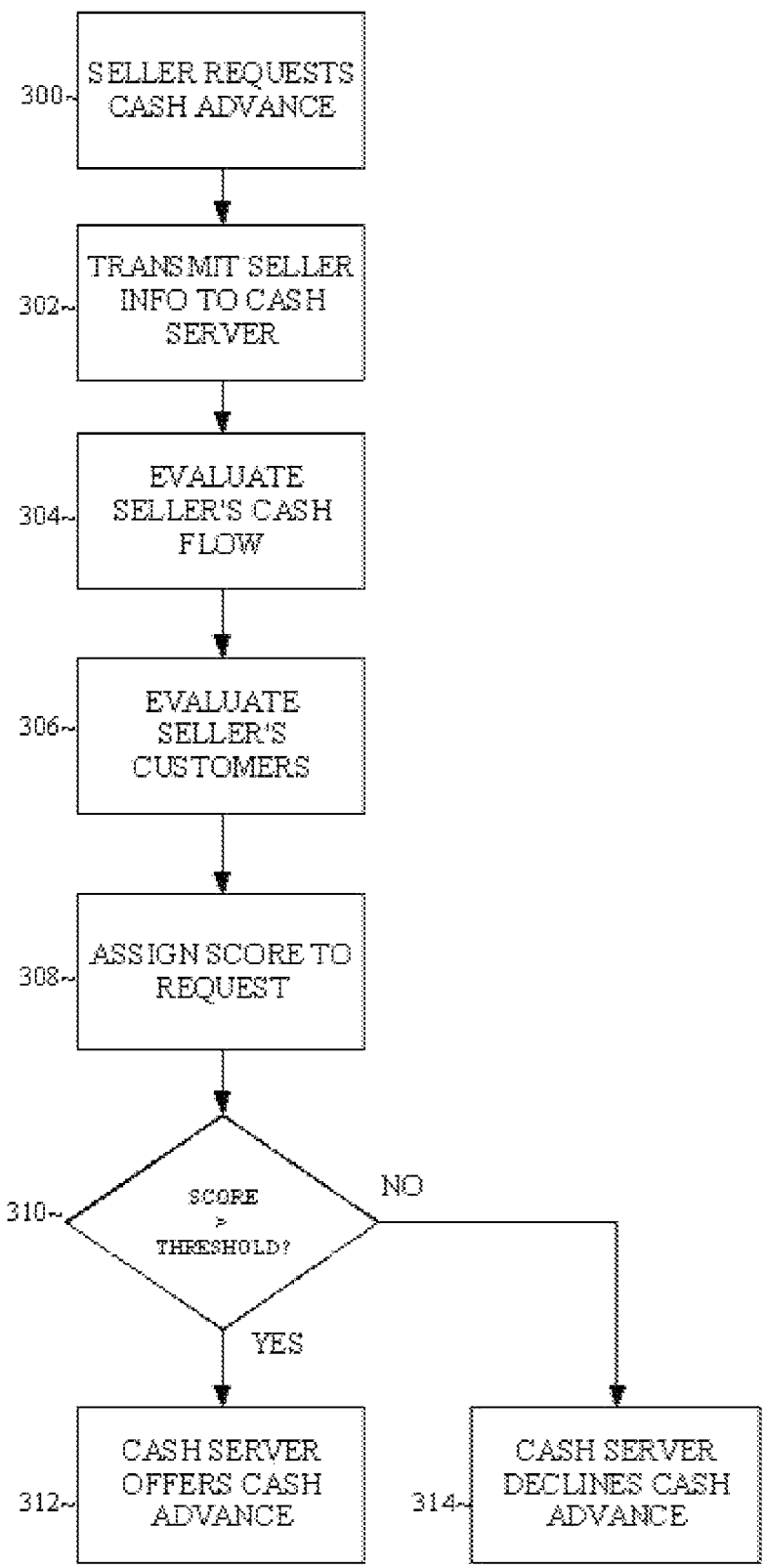
FIG. 3 is a flowchart illustrating an exemplary method of completing a cash advance transaction, according to an embodiment.

FIG. 3 is a flowchart illustrating an exemplary method of completing an advance transaction, according to an embodiment. It is noted that the methods illustrated in FIGS. 2-3 (and all related operations) can operate automatically and instantly (subject to normal computer processing times). The transfer of money to the seller (including all of the operations required therein) can also operate (once the seller indicates his/her decision that they want the cash) automatically and instantly (subject to normal computer processing times).

The method can begin with operation 300, wherein the seller requests a cash advance. The seller can press a tab or button using the standard interface on an online commerce web site, upon which the seller can be prompted with a screen that can ask how much money the seller wishes to be advanced (although in another embodiment the seller does not specify an amount of money and the system would compute and inform the seller how much the seller qualifies for) and any other relevant information. In the alternative, the system can skip this operation (the seller does not have to make a request) and go straight to operation 302 and subsequently to operation 304, where the system will analyze the seller's sales history information and indicate to seller the amount that the cash provider is willing to advance to the seller. The seller will make a decision as to how much of the available cash the seller wishes to receive. The request may also require the seller to identify a financial transaction account that the seller uses to process its transactions (e.g. PAYPAL) so such account can be evaluated as well and used to transfer funds (to and from the seller). All of this information is transmitted to the cash server.

From operation 300, the method proceeds to operation 302, wherein the seller's information is transmitted to the cash server. The seller's information can comprise all or some of the financial information known by the online commerce web site (e.g., sales history, etc.) as well as information received from third party sites (e.g., credit bureaus, etc.) The seller can be prompted to associate data sources (e.g., the seller's bank account, PAYPAL or other account used for sales on the e-commerce site, and the cash server can then pull information from those data sources and analyze that data. The cash server (in an embodiment) can then (based on all of the data obtained and the analysis of that data) determine (if the seller qualifies) a maximum amount the seller would qualify for and prompts the seller to enter the amount (no higher than the maximum amount) the seller desires to receive.

From operation 302, the method proceeds to operation 304, wherein the cash server evaluates the seller's cash flow. All or some of the cash coming into the seller can be evaluated, as well as cash leaving the seller (e.g., being paid from seller to other parties). The types of items the seller is selling can also be evaluated. Also, a variety of other data can be evaluated such as length in business, chargeback and reversal rates, seller rating, and, potentially, other data available. Essentially, any data that is accessible to the cash provider could be taken into account, as appropriate, in the cash provider's analysis.

From operation 304, the method can proceed to operation 306 (or this operation can be skipped), wherein the cash server also evaluates the seller's customers (parties that are paying the seller money). If these customers themselves have a good financial status then this weighs in favor of approving the transaction requested by the seller in operation 300. In some embodiments, the seller's customers would not be analyzed (e.g., in a merchant cash advance or lending model, this may not be necessary).

From operation 306, the method proceeds to operation 308, wherein the cash server assigns a numerical score using a formula applied to the relevant data retrieved from operations 304 and 306. This is similar to operation 308, although may or may not use a different formula to produce the score because this is not the factoring-type transaction in FIG. 2. Any additional information that may be relevant from any source can also be incorporated into the formula. Additional information can also be information from the financial account used by the seller which receives payments from all buyers (and other payments) to the seller. By examining this account (and details thereof such as all transactions), the cash flow of the seller can be determined. The score can typically be a single number, although in another embodiment it can be multiple numbers (e.g., a different value for more than one category of relevant factors). In another embodiment, the raw data may also be incorporated into a general formula in the absence of creating a score and used, as appropriate, to make a determination. Some of this raw data may be calculated into an average or aggregate number, but also not necessarily form the basis of a specific score when combined with other attributes.

From operation 308, the method proceeds to operation 310, which determines if the score computed in operation 308 is greater than a predetermined threshold requirement for approving a transaction. If the score computed in operation 308 is actually more than one number, then each of the numbers would have to be greater than a predetermined threshold in order for the transaction to be approved. In the alternative, the score could be used for other purposes such as line assignment, rate (or fee or other cost) calculation or special repayment requirement. In an embodiment, there can be more than one score, and approval requiring thresholds for each score.

If in operation 310, the score is greater than the threshold (or, at least, enables a transaction to proceed with other requirements, restrictions or limitations), then the method proceeds to operation 312, wherein the cash server completes the transaction requested in operation 200, which means that the cash server will initiate a cash transfer to the seller with particular repayment terms. In one embodiment the seller requests a particular amount of cash the seller would like. In another embodiment, the seller does not request a particular amount and the system determines and informs the seller the maximum amount the seller would qualify (based on the seller's score(s)) for (upon which the seller can accept or request a lesser amount).

If it is determined in operation 310 that the score is not greater than the threshold, then the method proceeds to operation 314 wherein the cash server declines to approve the transaction, and the seller is notified that the transaction is denied. Once again, a transaction may be approved even below a certain threshold, but cause other requirements to the terms of the provision of cash.

Figure 4:
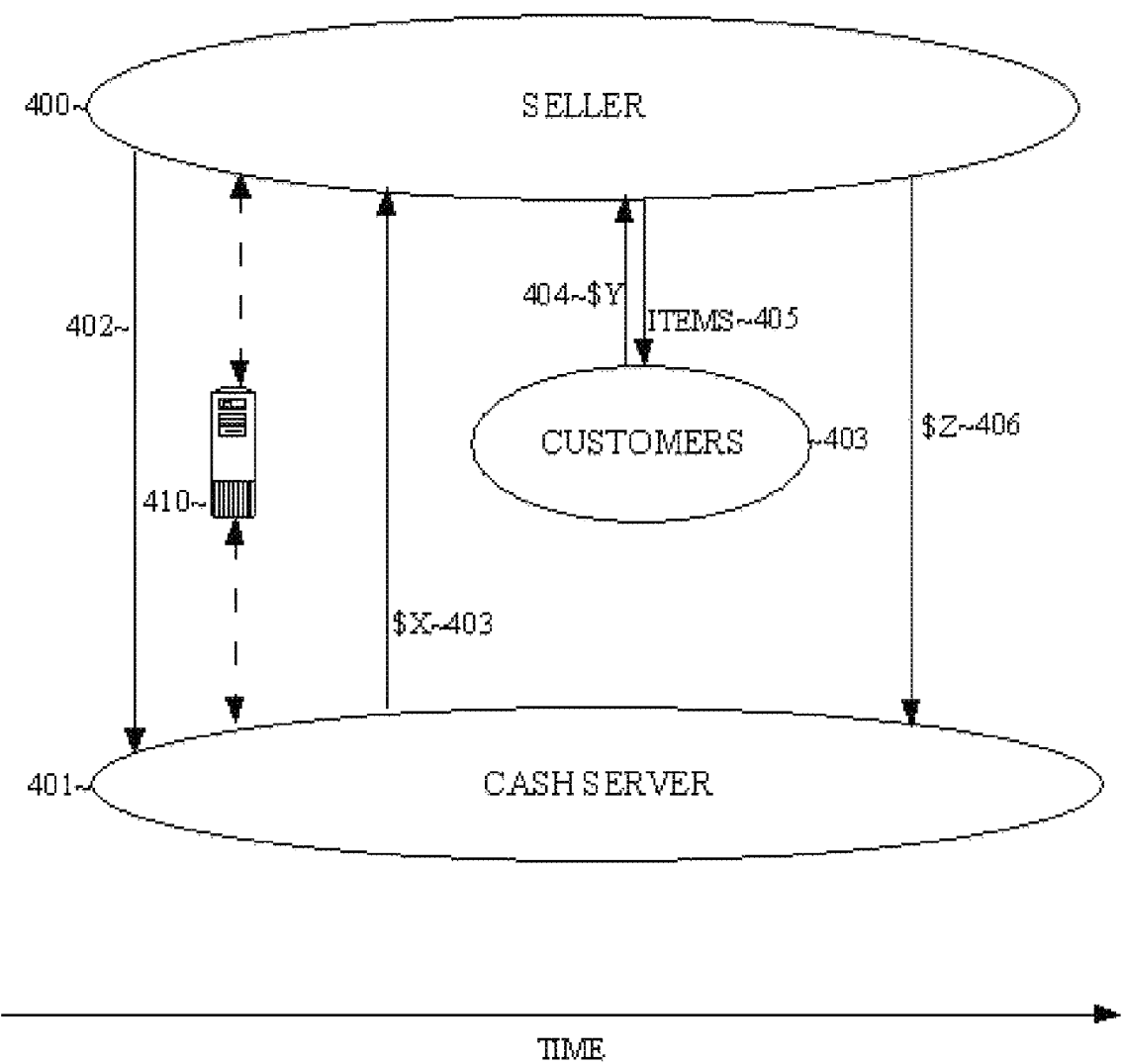
FIG. 4 is a flow diagram illustrating flows of money and items between different parties involved in a transaction, according to an embodiment.

FIG. 4 is a flow diagram illustrating flows of money and items between different parties involved in a transaction, according to an embodiment.

A seller 400 on an online commerce site makes a cash request 402 (loan, factoring arrangement, or cash advance) from a cash server 401. The cash server 401 evaluates the request which could include checking information with a database 410. The database 410 can be any single or collection of databases that may have relevant information about the seller and can include the online commerce site itself that the seller is utilizing where the request 402 was made. FIG. 4 assumes the request 402 was approved (the methods illustrated/described in FIGS. 2-3 can be used to determine whether the request is approved or not). In FIG. 4, time is represented on the x-axis, thus events take place in the order from left to right.

The cash server electronically sends a loan (or advance) in the form of cash 403 to the seller in the amount of $X. $X may be the amount of the original request 402, or it may be less if the cash server decided not to approve for the full amount of $X (or if the cash server initially determined a maximum amount of cash it desired to provide and, from there, the Seller 400 selects the amount the seller desires from the available amount). Seller 400 will receive a notice (typically via email, text or through a web/mobile interface) that the request 402 was approved and that $X cash will appear in the seller's account (bank account or account used with the online commerce site or other selected account) shortly.

Customers 403 of the online commerce site pay $Y 404 to seller for items (or services) and seller 400 delivers items 405 to the customers 403. This is done as known in the art, wherein the customers can pay the $Y 404 electronically to seller and the items 405 can be shipped via mail (or other means).

A payment of $Z 406 is made to the cash server 401 in order to settle the loan (or advance) of $X 403 made. In this manner, the seller 400 was (upon its request) provided with cash ($X) by the cash server 401 which was paid back to the cash server 401 using funds $Y 404 received from customers 403. The repayment process may also be automated such that the cash server can take cash automatically from a designated repayment source(s).)

Cash payments made between parties can be accomplished using an electronic payment processor (e.g., PAYPAL, ACH, etc.), which is not pictured in FIG. 4.

Typically, payment $X 403 from the cash server 401 to the seller 400 will be less than payment $Z 406 from the seller 400 to the cash server 401 so that the cash server will make a profit from the transaction.

When a loan, factoring arrangement, or cash advance (or other type of provision of cash) is made to a seller, the seller would typically repay the funds using an electronic payment account (e.g., PAYPAL). The funds can be taken out of the account automatically at agreed upon times (and amounts), until the entire amount due is paid off (or according to a schedule promulgated by the cash provider). The financial account used by the cash server 403 to make the loan (or advance) $X 403 would typically be same account user by buyers to make payments $Y 404 to the seller. This same account would also typically be used to repay the cash sever 401 the payments $Z 406. Thus, financial data from this account would be available to the cash server 401 at all times so that the cash server 401 would monitor the account and know when to automatically take funds from this account for repayment.

Figure 5:
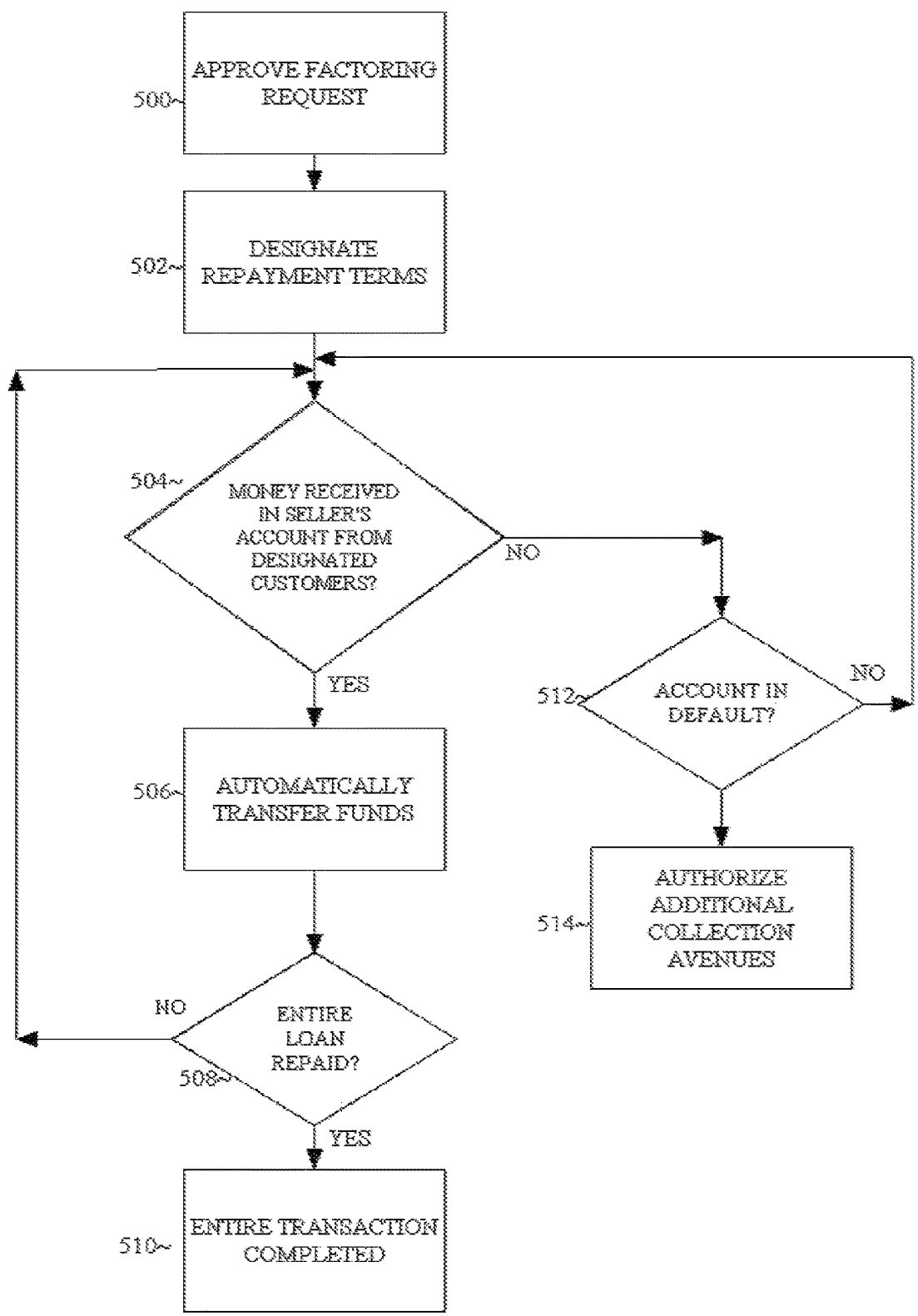
FIG. 5 is a flowchart illustrating an exemplary method of implementing repayment of a loan or advance, according to an embodiment.

FIG. 5 is a flowchart illustrating an exemplary method of implementing repayment of a loan or advance, according to an embodiment. The repayment method illustrated could apply to repayment to the cash server (cash provider) regardless of the arrangement and terms made regarding the disbursement of the initial cash amount to the seller by the cash provider.

The method begins with operation 500, wherein an advance or loan request is approved. This is done as illustrated in FIG. 2 and the accompanying description. If a factoring arrangement, the seller would typically designate which of the seller's clients (customers) the advance or loan would be against (repaid by receivables from). In other words, the cash server would be purchasing the receivables from the designated customers of the seller. If it was a merchant cash advance arrangement, then the seller would not need to identify particular clients (customers) because payments to the seller from any of seller's sales might be used to make payments to the cash server. The seller would also identify a financial transaction account that the cash server would have access to in order to make the initial loan or advance and also to automatically take funds from the seller using this account according to repayment terms.

From operation 500, the method proceeds to operation 502, wherein repayment terms are stated by the cash server. This can simply be in the form of the cash server sending a communication typically via email of the repayment terms or presenting such terms via a web interface. The repayment terms may be dictated by the cash server to the seller, or the seller may have had the option (in operation 500) to request particular terms (payment amounts, duration of loan, day of month to make payment, etc.). For example, a $10,000 cash advance against customers A and B would be repaid immediately from all funds received by A and B as funds are received. Alternatively, another payment arrangement could be a $10,000 advance against customers A and B but $5,000 per month from customers A and B would be taken on the tenth of each month for two months until the loan is entirely paid off. Thus, amounts per month in excess of $5,000 received from A and B can be kept by the seller. Another payment arrangement could be that $1,000 per month would be taken out for ten months regardless of which of the seller's customers (sales) the $1,000 was generated from (thus the origin of the funds are not relevant, $1,000 per month is taken regardless).

From operation 502, the method proceeds to operation 504, which determines if money received in seller's financial account (identified in operation 500) is from any designated customers. If not, the cash server would not have any right to take these funds, and the method can proceed to operation 512. In an advance arrangement that is not factoring (particular receivables are not earmarked and all receivables are used to make payments to the cash server), then this operation just checks if there is money in the account (regardless of who it was received from), in other words "designated customers" can be considered all funds in the account.

In operation 512 the cash server can determine if the seller's account is in default. If a repayment period has passed and the cash server has determined that not enough funds have been taken out of the seller's account to meet the repayment terms, then the seller would be in default.

If the seller is not in default, then from operation 512, the method returns to operation 504 which waits for more money to be received. If the seller is in default, then the method proceeds to operation 514, which authorizes additional collection avenues against the seller. The cash server (the lender or cash provider) would have other means to collect at its disposal in the event that the seller does not meet its repayment terms (e.g., take any money in the seller's account regardless of which customer it originated from, take legal action, etc.).

If in operation 504, money is received in the seller's account that is from designated customers, then the method proceeds to operation 506, which automatically transfers such funds from the seller's account to the cash server as a repayment. If the money in the seller's account is in excess of what is required for repayment for the current term (e.g., month), then only an amount that is in the agreed upon terms (in operation 502) would be taken. For example, if the agreed upon terms dictate that the seller is to pay $1,000 each month for 3 months from proceeds (receivables) from customer A, and at the first month the seller has receives $2,000 from customer A, then the cash server would automatically transfer only the $1,000 and wait until the next repayment term (e.g., next month) to transfer another $1,000 (but could transfer more if necessary or desired).

From operation 506, the method proceeds to operation 508, which determines if the entire loan or advance is repaid. If the entire loan or advance has not been repaid, then the method returns to operation 504.

If in operation 508 it is determined that the entire loan or advance has been repaid, then the method proceeds to operation 510, which completes the entire transaction (loan or advance). Of course, the seller is free to request another loan (or advance) at any time or may have remaining available funds if the cash server has provider seller with a cash line from which seller may take multiple advance up to the maximum available balance.

Figure 6:
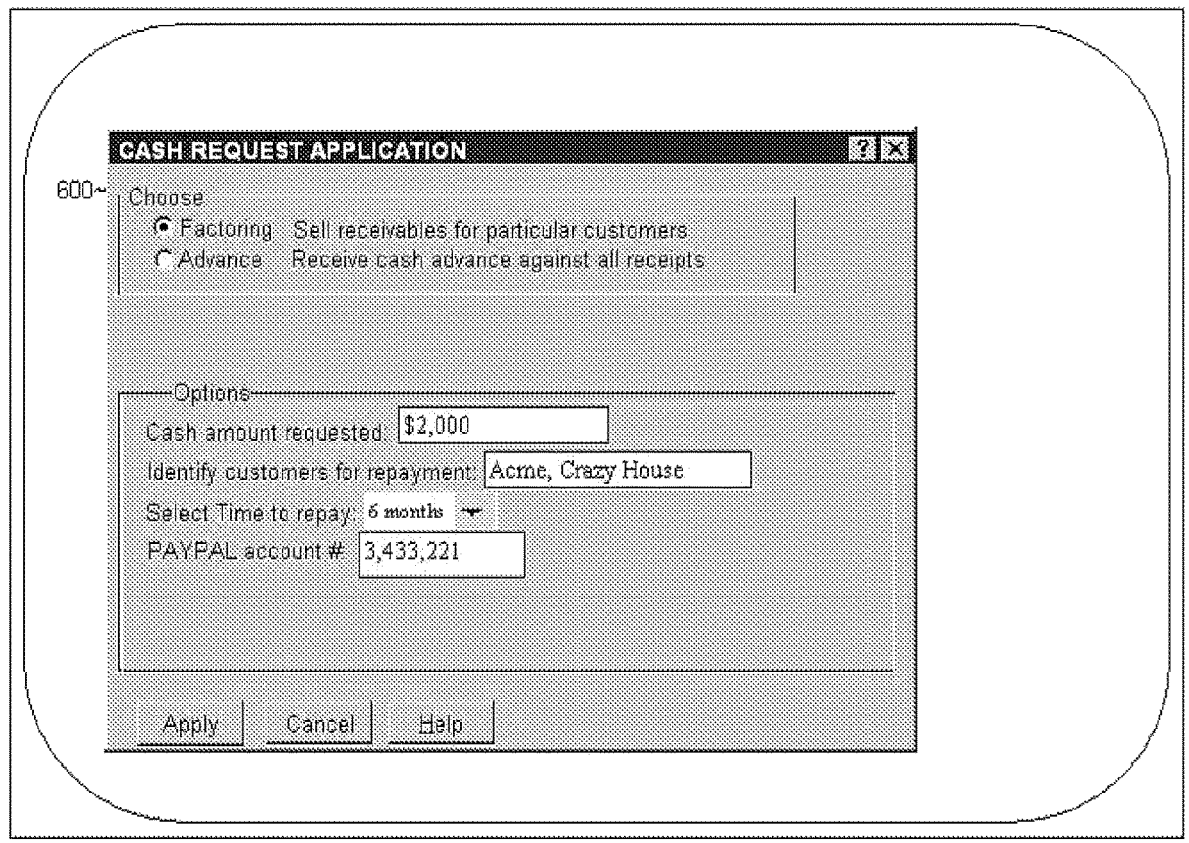
FIG. 6 is a window showing an application screen, according to an embodiment.

FIG. 6 is a window showing a loan or advance application, according to an embodiment.

Request window 600 can appear when a user activates a link (or other GUI input) to apply for a loan or advance on a web site. The button to apply for the loan or advance can be integrated with an online commerce site (e.g., EBAY, AMAZON.COM, etc.) so users of these sites do not have to separately register with the entity making the loan or advance (that administers the cash server). In addition, the online commerce site can cooperate with the cash server and share information so that the cash server would know information about the user (e.g., the user's name, address, financial information, sales information, etc.) without the user having to provide this information (or access to this information) separately.

After the user clicks "apply" the request is transmitted (operations 200) to the cash server for evaluation (FIG. 2). The request is typically evaluated and decided automatically, although in an embodiment there may be situations where a human operator may be asked by the cash server to approve the transaction.

Figure 7:
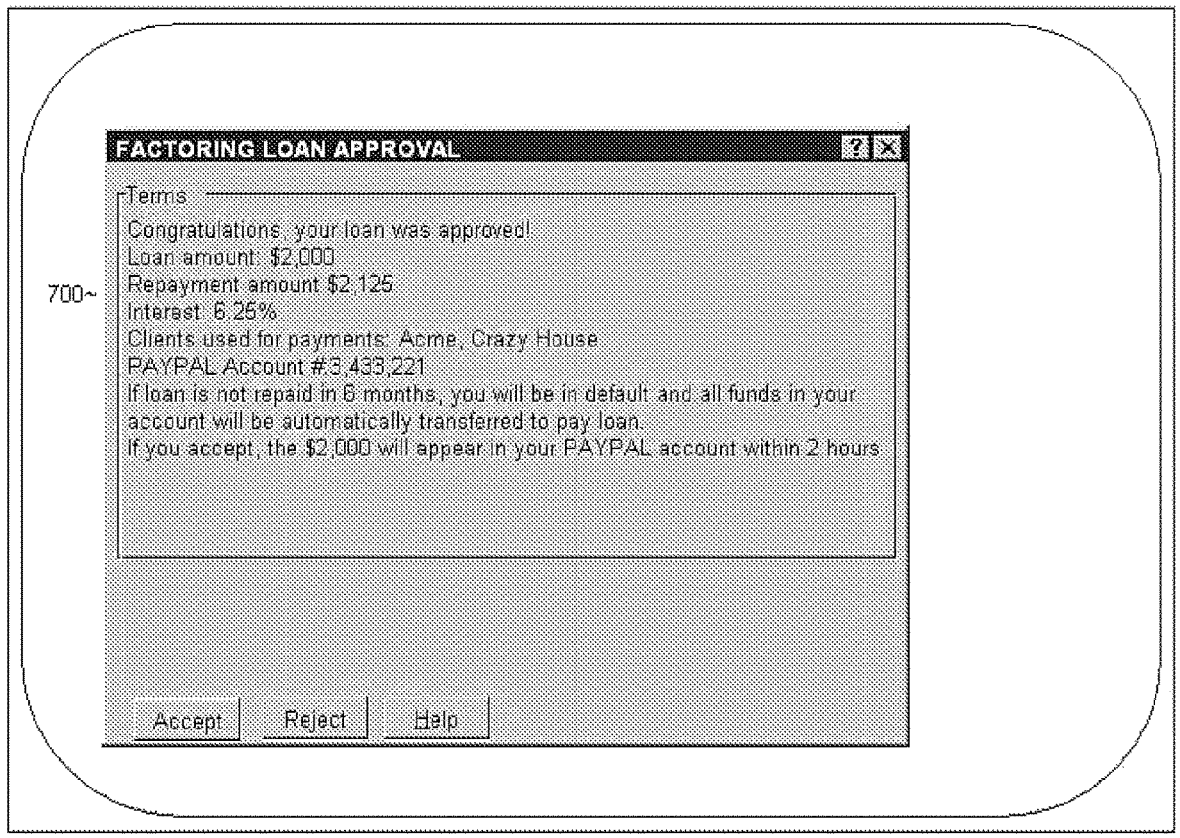
FIG. 7 is a window showing an approval screen, according to an embodiment.

FIG. 7 is a window showing a loan or advance approval, according to an embodiment.

An approval window 700 appears after the cash server has evaluated and approved the request (made in FIG. 6). The terms are shown that the user must agree if the user accepts the loan or advance. In an alternate embodiment, instead of a one-time approval amount and transaction, the user can be presented with a cash line (e.g., a credit line) and would be allowed to enter an amount of the cash line to receive as funds (with the difference still being available for withdraw). The user would be free to return and draw down his or her cash line (until the entire cash line is used up) at any time.

The embodiments/figures illustrated herein can apply to any loan or advance paradigm described herein, and the user is free to request which type he or she desires (e.g., traditional loan, advance, or advance based on factoring).

Figure 8:
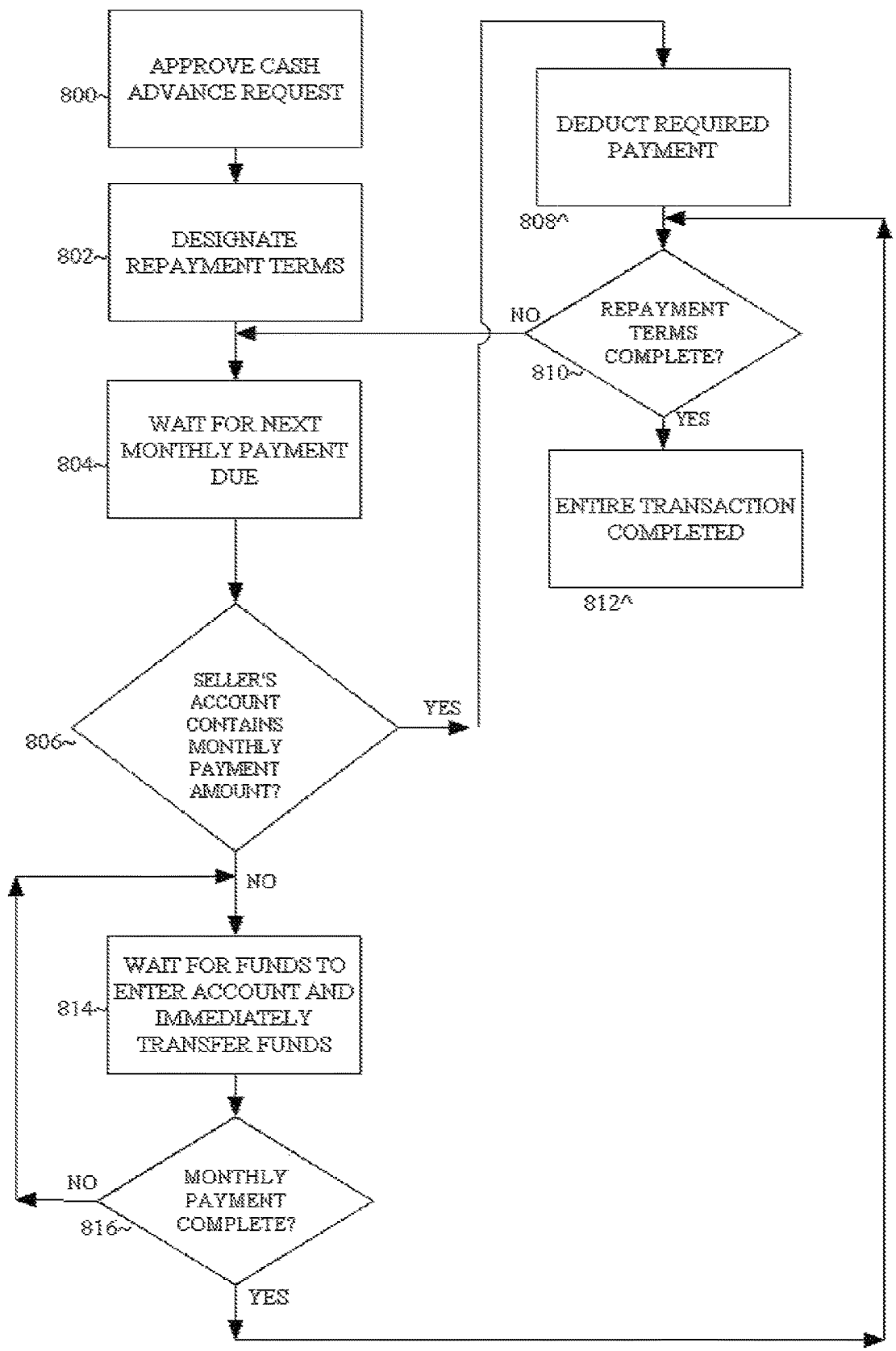
FIG. 8 is a flowchart illustrating an exemplary method of implementing repayment of a cash advance, according to an embodiment.

FIG. 8 is a flowchart illustrating an exemplary method of implementing repayment of a cash advance, according to an embodiment.

The method can begin with operation 800, wherein a cash advance request is approved. This can be done as illustrated in FIG. 3.

From operation 800, the method proceeds to operation 802, wherein the cash server designates repayment terms (e.g., interest rate, fees, discount, repayment period, cash advance amount, date payments are due, financial account used, etc.) The seller will typically have to accept these terms to have an officially binding contract.

From operation 802, the method proceeds to operation 804, which waits until the next monthly payment is due. For example, if the payments are due on the 10$^{th}$ of each month, then no collection activity will happen until this day.

From operation 804, the method proceeds to operation 806, which determines whether the seller's account contains the monthly payment amount. The cash server has access to the seller's financial account so it can see how much money is there and from what sources.

If in operation 806, it is determined that the seller's account does contain the monthly payment amount, then the method proceeds to operation 808, which deducts the required payment. This can be done automatically by using the financial account associated with the seller. In addition, if it is determined that the seller's account does not contain the entire monthly payment but does contain at least some amount, then the method could also proceed to operation 808, which deducts the lesser amount for payment. In this case, the seller would continue to owe the balance of the amount owed (and, optionally, some fee or expense for insufficient funds).

From operation 808, the method proceeds to operation 810, which determines if the repayment terms are complete (the loan or advance is completely paid off). If so, then the method proceeds to operation 812, wherein the entire transaction is completed. Of course the seller is free to make a new loan or advance request at any time that funds are available to the seller, including upon paying down principal amounts due.

If in operation 810, the repayment terms are not yet complete, then the method returns to operation 804.

If in operation 806, it is determined that the seller's account does not contain the agreed upon monthly payment amount (or contained a lesser amount) then the method proceeds to operation 814, which waits for any funds to enter the seller's account and quickly transfers funds to the cash server (or the cash server can wait for some amount of minimum funds to be available). If operation 814 is reached, the seller is delinquent and has missed the payment in operation 806. Once funds are deposited into the financial account used by the seller and associated with the advance, these funds are automatically electronically transferred from the seller's account to the cash server. In one embodiment, the cash server would take as much money from the seller's account in order to satisfy the past due amount. In another embodiment, once the seller has become delinquent on a payment, then the cash server would take as much funds in the seller's account as needed to satisfy the entire loan or advance amount (or, of course, can take some lesser amount at the cash provider's option).

From operation 814, the method proceeds to operation 816 which determines whether the monthly payment is complete. If the monthly payment is now completely paid, the method proceeds to operation 810. If the monthly payment is not completely paid, the method would return to operation 814.

Figure 9:
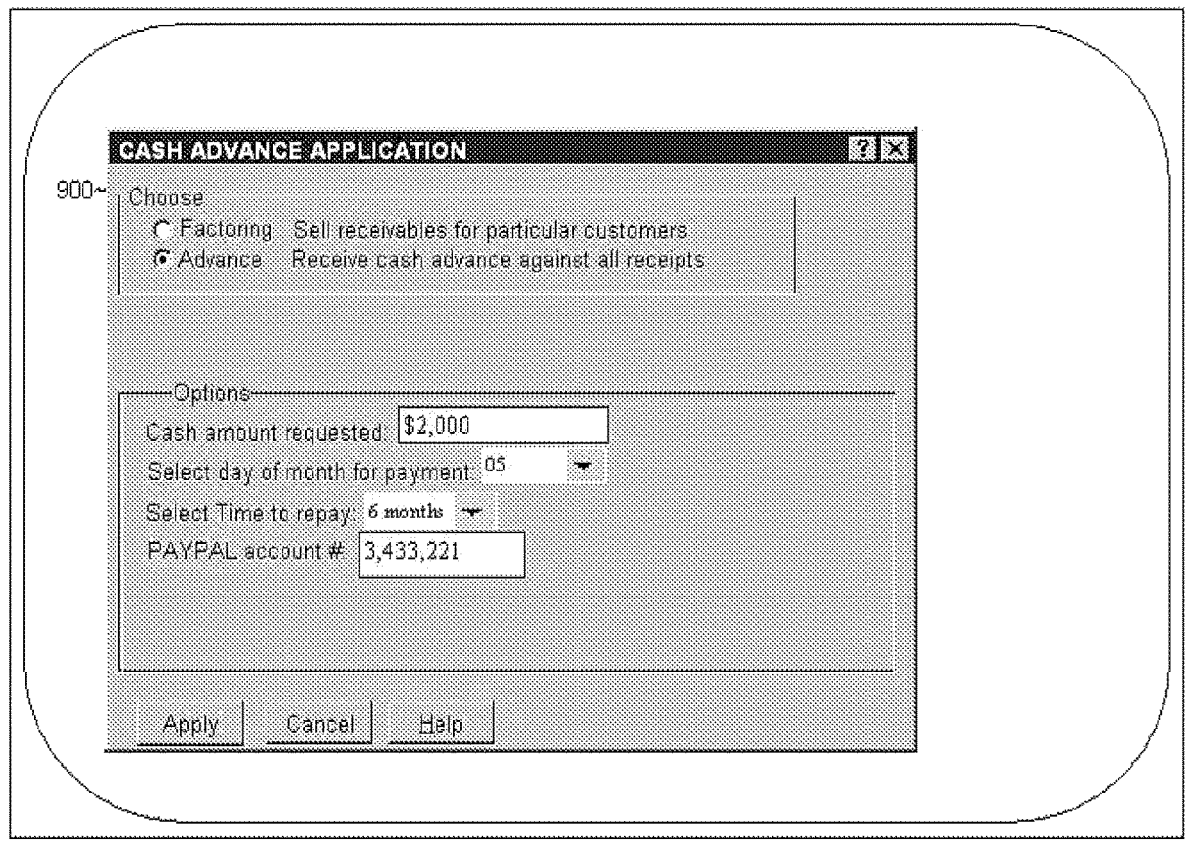
FIG. 9 is a window showing an advance application, according to an embodiment.

FIG. 9 is a window showing an advance application, according to an embodiment.

Cash advance application window 900 can appear when a user activates a link (or pressed a button, etc.) to apply for an advance or a loan on a commerce site. The button to apply for the advance or loan can be integrated with an online commerce site (e.g., EBAY, AMAZON.COM, etc.) so users of these sites do not have to separately register with the entity making the advance or loan (that administers the cash server) or, at least, facilitates adoption and use of the service. In addition, the online commerce site can cooperate with the cash server and share information so that the cash server would know information about the user (e.g., the user's name, address, financial information, sales information, etc.) without the user having to provide this information (or to just facilitate the user's provision of access to the data).

After the user clicks "apply" the request is transmitted (operation 300) to the cash server for evaluation (FIG. 3). The request is typically evaluated and decided automatically, although in an embodiment there may be situations where a human operator may be asked by the cash server to approve all or a portion of the transaction.

Figure 10:
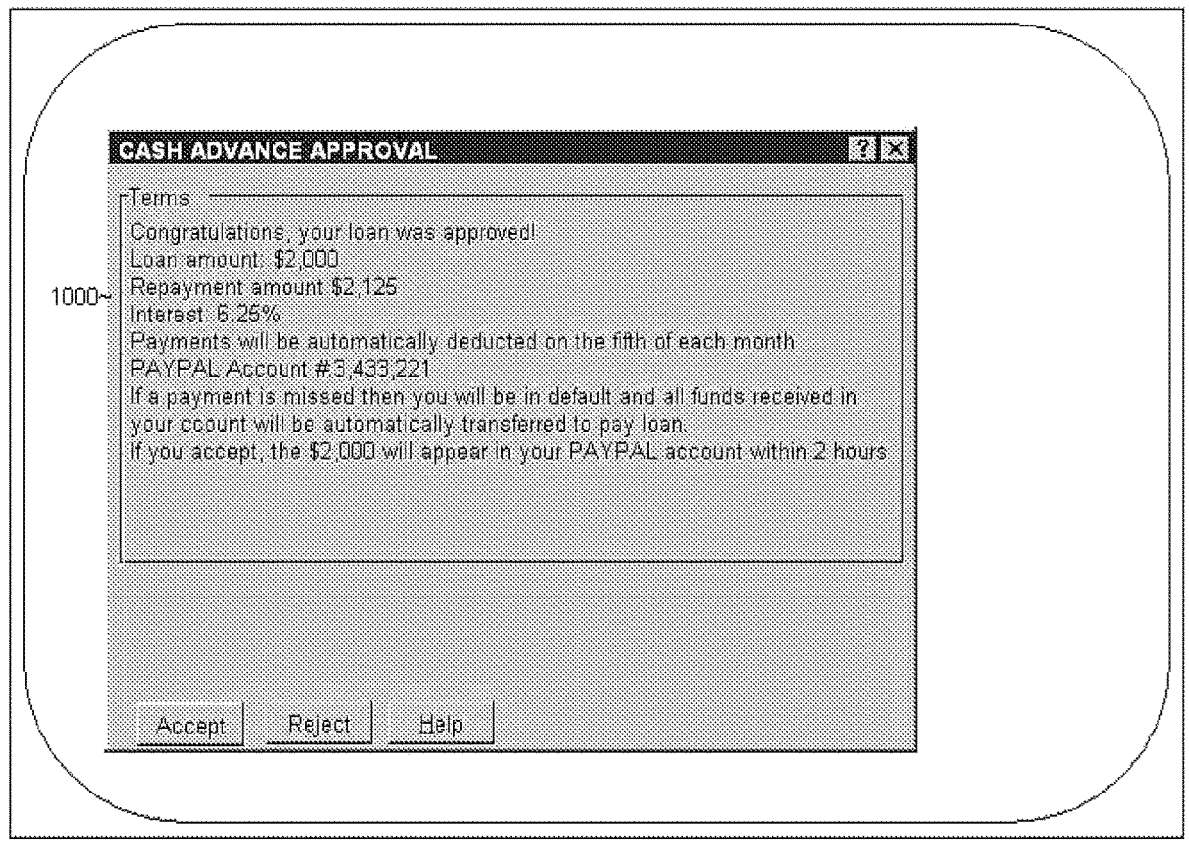
FIG. 10 is a window showing an advance approval, according to an embodiment.

FIG. 10 is a window showing an advance approval, according to an embodiment.

A loan or advance approval window 1000 appears after the cash server has evaluated and approved the loan or advance request (made in FIG. 9). The terms are shown that the user must agree if the user accepts the loan or advance.

It is noted that the seller can make application for a loan (cash advance, or other type of transaction where the seller receives money) right from the online commerce site itself (e.g., EBAY, AMAZON, etc.). The user would not have to separately log into a separate site, in that the entity hosting the cash server has an arrangement with the online commerce site (or is the online commerce site itself or an affiliate thereof) so that information (e.g., any information about the seller and his or her accounts, items for sale, sales history, financial information, etc.) can be shared between the online commerce site and the cash server. Thus, a button (or tab) for requesting a loan or advance is integrated into the online commerce site, notwithstanding it may be operated by a different entity than the online commerce site. In addition, an app (program downloaded and installed on a portable device such as a cellular phone) can also implement the methods described herein.

Any component, server, database, computer, etc., described herein can also be split up to comprise multiple components in a same or different locations (connected by a communications network). Thus, for example, while the commerce site host is referred to and pictured herein as one unit, it can actually exist over different databases, servers, processors, storage devices, entities, etc. The reverse is also true in that any reference to multiple servers providing the functionality herein can be combined into one or more servers. Any connection described herein can either be a direct connection or indirection connection through other nodes or components (either described herein or not). Further, any component or unit described herein can communicate with any other component or unit described herein, whether such communication is explicitly described herein or not.

In a further embodiment, the cash server can work with partner companies in order to market the ability to get a loan or advance to customers (clients) of the partner companies. For example, if the ACME Company has a customer list and wishes to market cash to the customers and their customer list, ACME can transmit their customer list to the cash server which has access to the decision making process. The cash server can then run the approval process (as illustrated in FIG. 2 or 3) for each of these customers to determine which customers qualify for a loan or advance and what terms. But instead of offering the loan or advance to the customers, the cash server would transmit the approval status (accepted with terms or denied) for each of the customers to the ACME Company. The ACME company can then contact (e.g., written mail, email, etc.) each of those customers that were approved to present them with a "prequalification letter", that is, a letter which tells them that if they apply for an loan or advance they would be approved. The prequalification letters can come from the ACME Company itself or from the cash server itself. This notification can also occur via a web interface as the customers of the partner company visit the website of the partner company.

Figure 11:
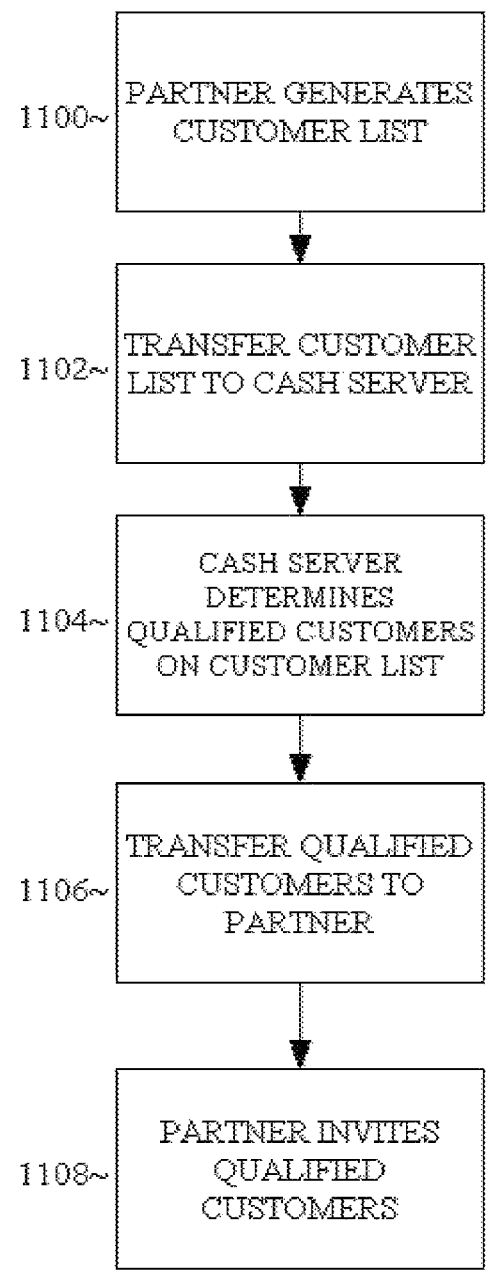
FIG. 11 is a flowchart illustrating an exemplary method of issuing instant loan prequalifications, according to an embodiment.

FIG. 11 is a flowchart illustrating an exemplary method of issuing instant loan or advance prequalifications, according to an embodiment.

The method can begin with operation 1100, wherein the partner company generates a customer list. The customer list can be all of the customers of the partner company, or a select list of some customers of the partner company (selected using certain criteria/criterion such as those customers that make at least a predetermined amount of money, etc.).

From operation 1100, the method proceeds to operation 1102, wherein the partner company transfers the customer list from operation 1100 to the cash server. The transfer can typically be done electronically which would identify each customer and provide identifying information of each customer (e.g., social security number, etc.). In another embodiment, operations 1100-1102 are not required, as the cash server could generate the initial customer list itself (e.g., from general advertising, demographic lists of potential customers, etc.).

From operation 1102, the method proceeds to operation 1104, wherein the cash server determines which of the customers in the customer list would be approved for a loan or advance. This can be done as described herein. Terms for approved customers can be determined as well (e.g., how much money each customer would be entitled to borrow, interest rate, etc.). A loan or advance could also be considered a line of available funds and from which an amount (up to the total available cash) can be taken. All of the embodiments described herein can take this form.

From operation 1104, the method proceeds to operation 1106 which transfers the qualified (approved) customers (and terms) from operation 1104 to the partner. Alternatively, all customers from the original customer list (from operation 1100) can be transmitted to the partner along with each customer's respective status (denial, approval and terms).

From operation 1106, the method proceeds to operation 1108, the partner can invite the qualified (approved) customers to then apply (or accept) the instant cash loan or advance. The invitation can typically be via email, although it can be made in other forms as well (e.g., paper mail, telephone call, text message, etc.). The invitation can also be made directly via a web interface during the application process so such process can be continuous. The invitation can be branded on behalf of the ACME Company (and in fact, can be made through the ACME Company using the cash server without the customer knowing that the cash server (or any other party) is really involved). Or, the invitation can come directly from the company operating the cash server or an affiliate thereof.

In this manner, a company's customers can be given prequalifications without having to be initiated by the cash server (or the company operating it).

In a further embodiment, when a user registers with the cash server (or any type of server/system), the user can be presented with a profile building system. A profile building system allows a user to enter (or provide access to) some amount of initial information, for example specific items (e.g., name, email, etc.) and other information—either other specific requirements and/or information within specific categories of possible information (e.g., a repayment account, a marketplace account, etc.). As stated, entering certain initial information is mandatory. Mandatory typically would be required in order to open an account and/or have some amount of cash available. The user is invited to enter additional (and optional) information into the system, which is not required to maintain an account with the server and/or have available cash but may be to the advantage of the user to enter. Optional information can be a variety of information that electronic systems can collect through access to a third party site or provided by the user directly. In certain embodiments, if the data is collected through access to a third party site, this data may be difficult if not impossible for a user to manipulate—e.g., data related to sales occurring through an ecommerce marketplace which is collected by the ecommerce marketplaces in connection with transaction executed on its system. Therefore, the data is not self-reported (and, consequently, more difficult to manipulate by the user). Other examples of data and/or data sources include, without limitation, additional marketplace or channels in or through which the seller distributes or sells products and/or services, friend lists, fan pages, tweets, Twitter followers, blogs, bank account of the user (or a principle of the business), repayment sources, a list of all current assets, a list of all bank accounts, a list of recommendations for the user, or any other such information. It is in the server's (cash server or other server) interest to gather as much information about each user as possible. The more information the server knows about a user, the more accurately the server can understand and conduct transactions with that user (e.g., make loan offers, make mortgage offers, etc.), offer additional capital or modify rates, fees, discounts and/or charges. Typically, people and companies in general are reluctant to reveal personal information on a web site or computer communications network, mainly due to privacy reasons. Thus, the server (including the company operating the server) should provide incentives to users to enter more of their personal information into the system.

This incentive can be achieved by providing "levels." Each level can represent a different set of optional information (it can even be just one value), and when the user fills in the set of information then the user has completed that particular level (although the user may have additional information that it can provide within that level then or in the future). Each level completed would typically entitle the user to a benefit (although some levels may have no benefit). A user may fill out all possible levels, upon which the user would be entitled to the maximum benefit of using the system. A user may have filled out some levels (but not all), wherein the user will receive some benefits of filling out the levels the user filled out but would not receive the maximum benefits (because all levels were not filled out). These benefits can be specific to the user or generally available to any customer completing a particular level. The information to complete a level may simply be account information so that the system can access the user's information on another platform (e.g., the user's account number and password for a bank).

For example, if a user is applying for a loan or advance, and there are five levels of optional information, if the user fills out all five levels the user would receive the lowest possible interest rate (e.g., 4%) or other reduced cost for accessing cash. If the user filled out three levels (and omitted two of the levels) then the user can receive a discounted interest rate (e.g., 5%) but not the best rate or other reduced cost for accessing cash. If the user has not filled out any of the levels, then the user could be offered a highest interest rate (e.g., 6%) or other reduced cost for accessing cash because this user has not filled out any of the optional information. There are other ways of implementing profile building, which may or may not involve the levels as described above. Also, the benefit to the cash provider or lender in the customer providing access to additional information is that the provider can get a better understanding of the customer and/or easier access to repayment. More information can enable the cash provider to gain comfort that the customer will be able to afford repayment to a larger amount of cash. Access to additional repayment accounts will further reduce risk for the cash provider, because there will be additional avenues to repayment. Therefore, it is possible for the cash provider to increase the loan or cash amount and/or reduce the cost of the loan or advance to the customer.

It is noted that the user's level is a factor in determining transaction terms. For example, an interest rate on a loan or charges for an advance may be determined by incorporating both the user's credit score and the user's level. For example, Table I illustrates an example of using a credit score and a level reached to determine an interest rate.

TABLE I

| FICO score | max level achieved | interest rate |
| --- | --- | --- |
| <600 | <5 | 10% |
| <600 | 5 | 8% |
| 600-700 | <4 | 9% |
| 600-700 | 4 | 7% |
| 600-700 | 5 | 6% |
| >700 | <4 | 6.5% |
| >700 | 4 | 5% |
| >700 | 5 | 4% |

In the example in Table I, the user must fill in levels in a particular order (e.g., complete level 1, then complete level 2, then complete level 3, etc.) For example, a user with a credit score of 710 who made it to level 4 (but not level 5) would get an interest rate of 5%.

In an alternative embodiment, the user is not required to fill out levels in order and can pick and choose which levels to fill out (again, a level can simply be considered a set of one or more data fields for the user to enter). In the latter embodiment, the determination of transaction terms (e.g., interest rate, etc.) can incorporate credit score (and other such information) and which particular levels the user has completed (e.g., certain levels may be more beneficial to the user than other levels). Table II represents one example of such embodiment using a system that has only two levels.

TABLE II

| FICO score | levels completed | interest rate |
| --- | --- | --- |
| <600 | none | 10% |
| <600 | 1 | 9% |
| <600 | 2 | 8% |
| <600 | 1, 2 | 7% |
| 600-700 | none | 9% |
| 600-700 | 1 | 8% |
| 600-700 | 2 | 8% |
| 600-700 | 1, 2 | 6% |
| >700 | none | 7% |
| >700 | 1 | 5% |
| >700 | 2 | 6% |
| >700 | 1, 2 | 4% |

In Table II, a user would be best off by completing both levels in order to achieve the lowest interest rate.

In an embodiment, the data gleaned from filling out a level can also be used in order to determine the interest rate (or other terms that are computed). Also, the data provided does not necessarily have to be considered as separate "levels" but rather just comprise additional information that would be useful in underwriting and valued by the cash provider. In this embodiment, the interest rates (or other computed terms) are not determined using a discrete table but using a formulaic approach using all of the inputted information with benefits achieved for filling out more levels or simply providing access to additional information. For example, a numeric score can be computed using all available information inputted into the system or obtained through access to a third party site as a result of authorization by the user. The numerical score can be improved (e.g., increased by a value) for each optional level completed (e.g., for each optional level completed the user's score is increased by 1) or simply by providing access to additional information (which information may fall into a category of information that is important to the cash provider, such as marketplace/channel data or repayment mechanisms). Thus, the terms of the transaction (e.g., interest rate, loan/advance amount provided or accessible) is determined by the data obtained (which can be used to determine a score) with an adjustment in the score for the levels completed (improvement for additional levels completed) or simply the information or repayment mechanisms obtained. There is, of course, a possibility that information provided could result in a decrease of cash being provided or rates (or charges) increasing. Thus, it is possible that a user who completes a level or provides access to information for all current assets may diminish his overall score if the user has little or no assets. Even though the score may be increased by a predetermined value (e.g., 0.5) for completion of this level, this still may result in a lower overall score (and hence worse interest rate or other charge or term) than if the user had not completed the asset level. Alternatively, the algorithm can be designed such that even if the user achieves the worst score possible regarding the asset level (e.g., zero assets) with the numerical incentive for completing the asset level, the user will still achieve a better score (and hence a better interest rate for the user) than if the user had not filled out (completed) the asset level at all (or simply result in no change to the score). While it may be assumed that a higher score is better for the user (and thus increasing the user's score as an incentive will favor the user), it may be that the score metric is designed such that a lower score results in more favorable to the user (as opposed to a higher score) and in this embodiment as an incentive the user's score will be reduced by an amount (which will be to the user's advantage).

"Filling out" (or entering data) can mean a variety of manners of capturing information including gaining access to third party data sources typically with the permission of the user. Further, in certain embodiments, the user may add data sources at any time and, potentially, receive one or more of the benefits described herein when such information is obtained and analyzed. Using levels is just one approach for categorizing information that is desired to further understand/analyze a particular customer. Information could be provided by category and each category could have many possible data subcategories that could be completed by the customer. The customer may complete anywhere from none to all of these data subcategories and, depending upon the degree of completion, gain access to additional cash availability and/or better rates.

A graphical user interface (GUI) can be used in order to receive the information from the optional levels from the user or provide a path to the user to provide the cash provider with access to data. Of course, there can be numerous implementations of a GUI and this is merely one example. A third party tool, such as YODLEE or CASHEDGE, may also be used to obtain this information.

When a user completes more of the optional information in the user's profile, this can (in an embodiment) serve to provide the user with an increased cash line (the cash line being an approved amount of a loan or an advance).

Figure 12:
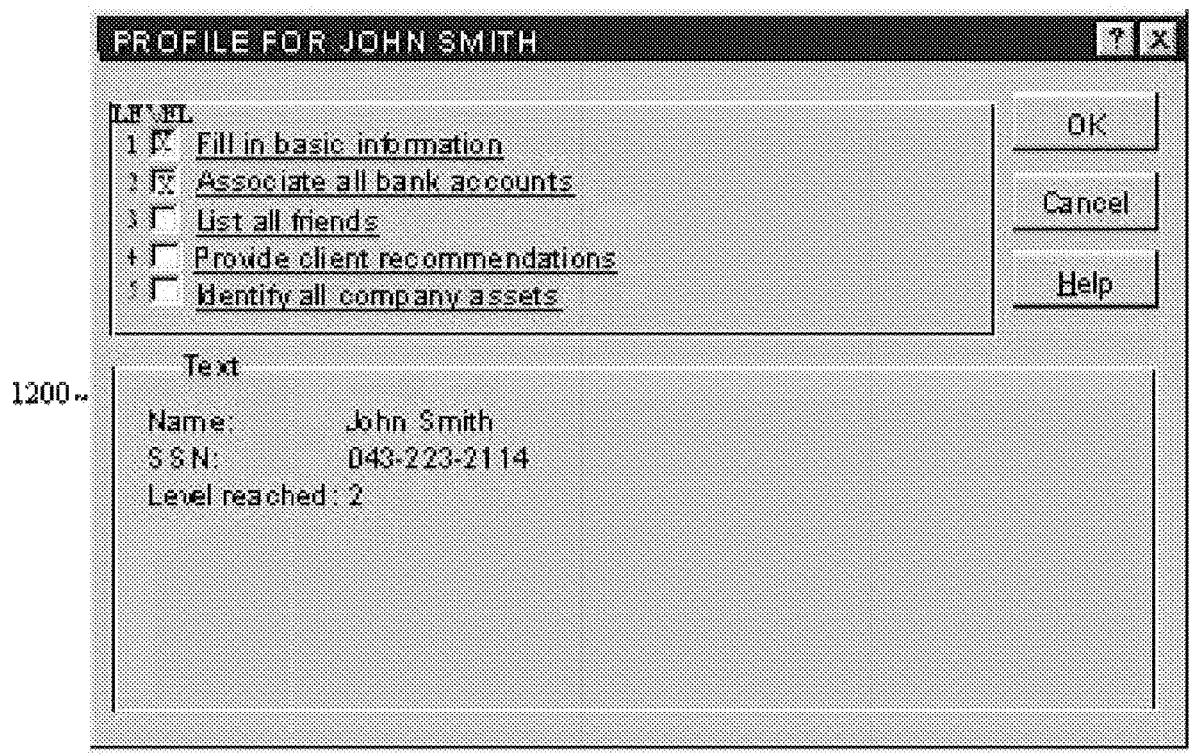
FIG. 12 is a window showing a list of profile building levels, according to an embodiment.

FIG. 12 is a window showing a list of profile building levels, according to an embodiment.

The window 1200 shows five different optional levels (numbered 1 to 5) the user can fill in (this user has completed the first two levels since they are checked). If the user wants to complete a level (or review/modify a previously completed level) the user can click the underlined description of that level, which will then bring up a window for that level.

Figure 13:
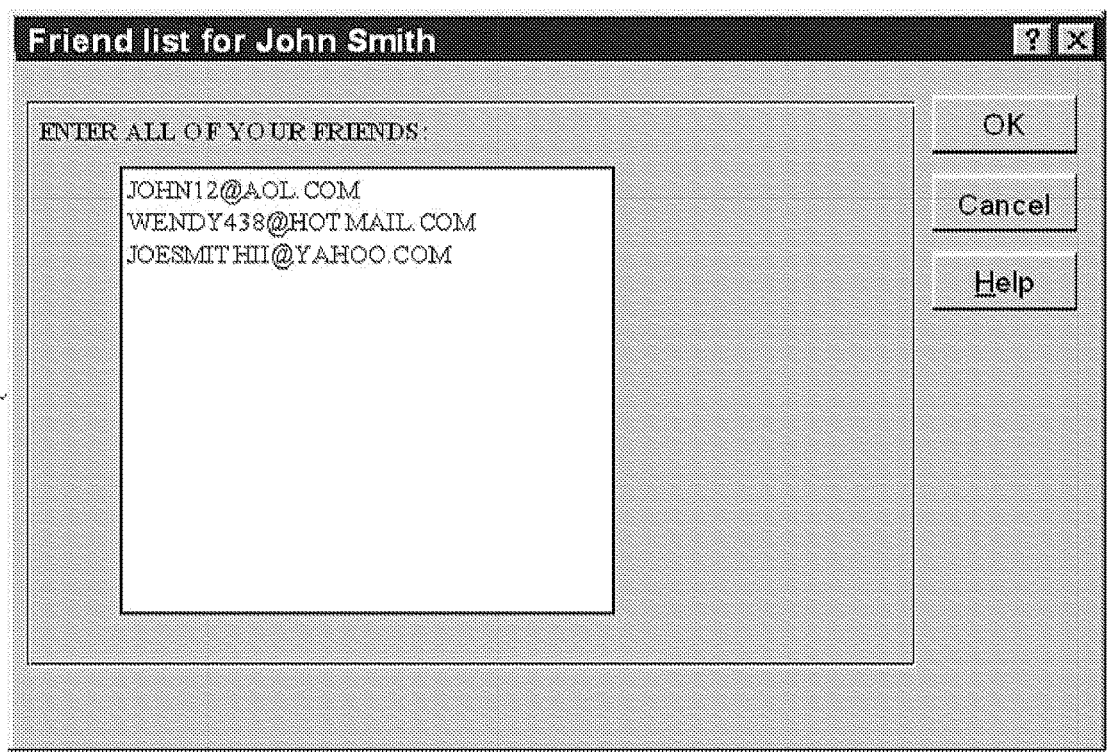
FIG. 13 is a window showing a friend list for a user, according to an embodiment.

If the user clicks level 3 ("list all friends") then the window in FIG. 13 would be brought up. Instead of the user manually typing in all of their friends, as an alternative approach the user can be prompted for the user's account name and password on a social networking site (e.g., FACEBOOK) and one the user enters his or her username/password, the system can automatically sign onto the user's account and automatically scrape the user's list of friends. This approach can be done for a variety of sources, such as banks, financial accounts, social networking sites, etc., wherein the user can simply provide the user's logon information (typically username and password) for different sites and the system can automatically sign on and gather the information it needs from those sites. For example, providing the login information for the user's FACEBOOK account could be considered to be completing a level (or set of data) and entitles the user to an incentive (e.g., an increased numerical score). In addition the information gleaned from the account could be used in any decision making (for example if the user provides his or her credit card login information and the system determines that the user has a good credit record (with this particular source) then this could weigh in the user's favor when the score is determined as to whether to approve the user's request (and the maximum amount to make available). If the user has a bad credit record with this source then this could hurt the user's score although typically the user would be given some type of incentive (such as an increase in the score) just for providing the login information (although in an embodiment the user might not be given such an incentive).

FIG. 13 is a window showing a friend list for a user, according to an embodiment.

Friend window 1300 allows the user to enter his friends. Friends can be email addresses of the user's real life-friends, colleagues, etc. The system can use this friend list in any way it sees fit (e.g., send an email or message to each of these friends inviting them to join).

The user can then click "OK" to return to the window 1200.

It is noted that typing information manually is suboptimal and it is easier for the user (and more accurate) if the system can retrieve information automatically directly from other sources. Thus, a user is encouraged to enter his or her login information for other web sites (such as YODLEE which can gain automated access to accounts). The information retrieved in this manner can then be analyzed automatically.

FIG. 14 is a window allowing a user to enter login information for a number of web sites with relevant information.

Window 1400 allows the user to enter login information for a number of different online sites which may contain personal information about the user. Such personal information would be helpful when the system makes a determination about whether to approve a money request from the user and if approved, the maximum amount that will be approved.

In window 1400, the user has entered the user's FACEBOOK login information. The system then can log into the user's FACEBOOK account and gather data therein, such as the user's friend names, listed occupation, fan pages of the user, etc. The user may be an individual (e.g., sole proprietor) or a business. The user also entered the user's banking login information. The bank name can be selected from a drop-down menu bar and the system would know the web address to log into from the bank name. The system can then log into the user's online banking account and retrieve data such as the user's current balance, banking volume, etc. This data can be stored with the user's account in the cash server and used in the scoring model to determine the user's score(s).

The user can be presented with an incentive for entering the login information (just as with entering other information manually). For example, if the user provides login information for certain sites, the user can receive: an increased amount of cash (if approved), for example an additional $1,000; an additional point in the user's score; a reduced interest rate for repayment; or any other incentive. The user's score (as stated herein) can be used not just to determine whether the user is approved, but other terms as well (e.g., amount approved for, repayment terms, interest rate, etc.) A score can also be considered to be a set of values (more than one value), with different values used to determine different terms (e.g., interest rate, amount advanced, etc.). Entering login information for different web sites may each have their own particular incentives, and the system may (or may not) present the user with the incentives as an encouragement for the user to enter the login information. If the user does not provide the login information, the user will not receive the incentive (that the user would have received if he/she provided the login information) and can optionally (depending upon the embodiment) receive a penalty (e.g., higher rate, etc.).

Login information can be collected and entered for any social networking site. For example FACEBOOK, TWITTER, LINKEDIN, etc. The system can automatically log into the user's account on such sites (because the user provides the login information such as the username/password) and relevant information can be retrieved. Alternatively, there may be some other mechanism provided by the social networking site to gain access to a particular user's information. The relevant information can then be analyzed in order to incorporate such information into the decision model (which determines whether to approve a loan or advance to the user and how much cash to extend). For example, does the user has a fan page, how active is the fan page, how many people "like" the fan page, how active are the comments on the fan page, how frequently are new articles are posted on the fan page, etc. For example, for TWITTER, information can be analyzed such as how often does a user "TWEET", how often is the TWEET or information RETWEETED, how many people the user follows, how many people follow the user. Metrics can also be applied to the people who follow the user (and/or the people who the user follows) and how successful they are. For example, LINKEDIN can also be utilized to analyze the employees in the user's company, how many people follow/access the company's page on LINKEDIN, etc.

Such data can be relevant to the decision model. For example, a LINKEDIN user who has a company with more employees might be scored better (and hence be eligible for a higher amount of money) than if the same company had less employees registered on LINKEDIN.

TABLE III

| site | metric | significance |
| --- | --- | --- |
| FACEBOOK | user has more friends | favorable |
| FACEBOOK | user has less friends | unfavorable |
| FACEBOOK | fan page exists for user | favorable |
| FACEBOOK | no fan page for user | unfavorable |

TABLE III-continued

| site | metric | significance |
| --- | --- | --- |
| FACEBOOK | more people like user's fan page | favorable |
| FACEBOOK | less people like user's fan page | unfavorable |
| FACEBOOK | more people comment on user's fan page | favorable |
| FACEBOOK | less people comment on user's fan page | unfavorable |
| FACEBOOK | new articles posted more frequently on user's fan page | favorable |
| FACEBOOK | new articles posted less frequently on user's fan page | unfavorable |
| TWITTER | user has more followers | favorable |
| TWITTER | user has less followers | unfavorable |
| TWITTER | user's followers have more followers | favorable |
| TWITTER | user's followers have less followers | unfavorable |
| LINKEDIN | user's company has more employees | favorable |
| LINKEDIN | user's company has less employees | unfavorable |
| LINKEDIN | user's profile has more views | favorable |
| LINKEDIN | user's profile has less views | unfavorable |

Table III above is an example of how different metrics can be applied to the user's account on different social networking sites and how they may affect the user's overall qualifications. In Table III, "favorable" refers to the user receiving a relatively better score (typically numerical score although it does not have to be numeric) which would typically qualify the user for a loan/advance and/or help the user qualify for a greater cash amount. "Unfavorable" refers to the user receiving a relatively worse score (typically numerical score although it does not have to be numeric), which would typically hurt the user's chances for a loan/advance approval or help reduce the cash amount for which the user would qualify. Typically, the metrics applied to a social networking site will be combined with other metrics (as discussed herein) in order to determine the system's final decision regarding the user (whether the user is approved and for what terms). Thus, in one embodiment, the information used from the user's social networking site(s) may have a relatively small effect on the final decision for the user. Different components of the analytic process may have different weights (e.g., the user's banking information may be weighted at 40% while the user's social network information may be weighted at 10%, with the user's sale's date weighted at 50%) of the final decision. Of course, this is merely an example and the system could weight all of the different data it has at its disposal in any selected manner.

In addition to the social sites mentioned above, of course any other social networking web site could be used and any type of data from such social networking sites could be retrieved, analyzed and form part of the decision making process.

Figure 15:
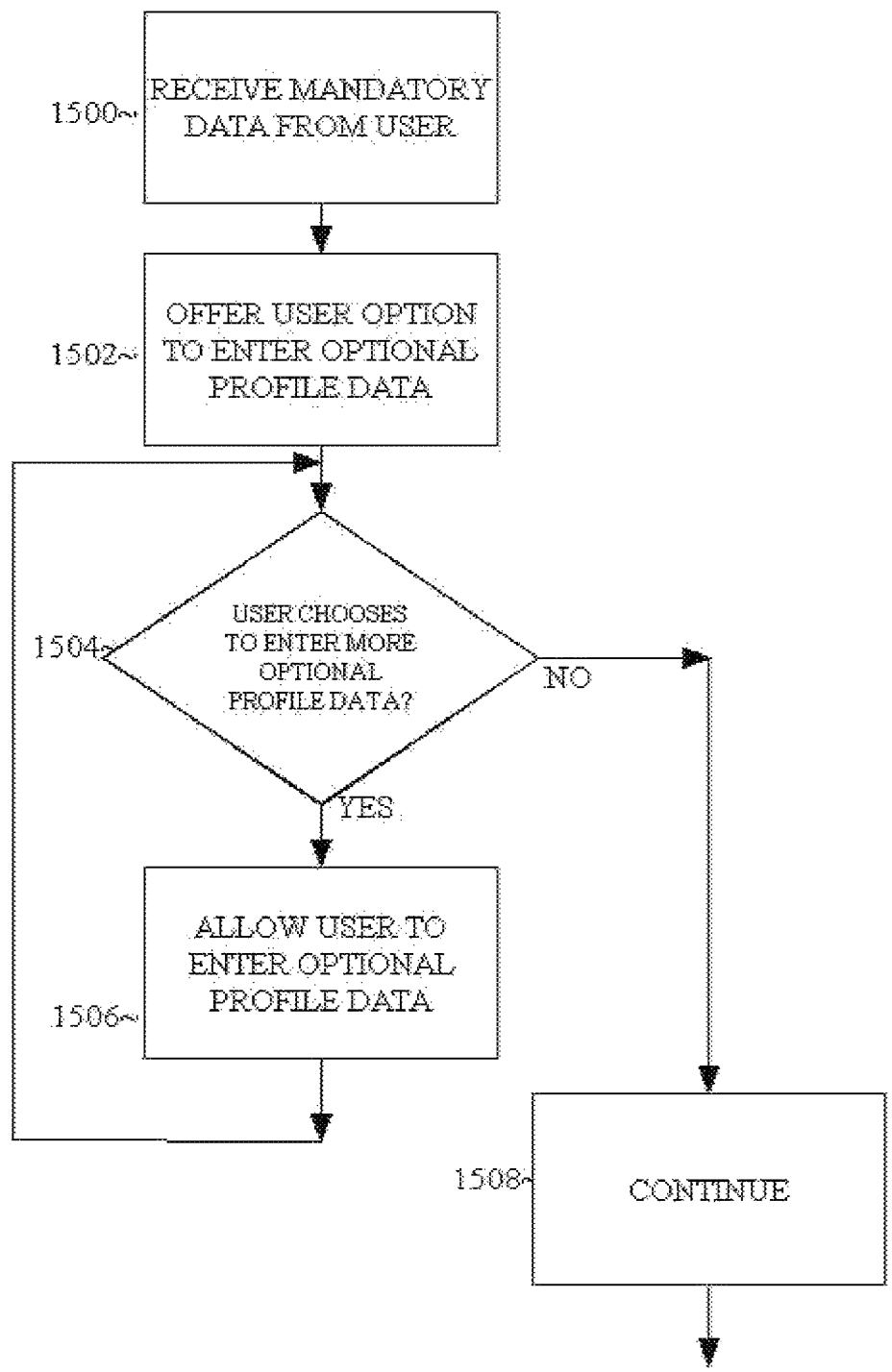
FIG. 15 is a flowchart illustrating an exemplary method of allowing a user to enter profile data using profile building levels, according to an embodiment.

FIG. 15 is a flowchart illustrating an exemplary method of allowing a user to enter profile data using profile building levels, according to an embodiment.

The method can begin with operation 1500, which receives mandatory information (data) from the user (e.g., real name, email address, etc.). Certain fields would be mandatory in order for the user to continue with the registration process.

From operation 1500, the method proceeds to operation 1502, which offers the user an option to enter optional profile data. The optional profile data can be entered in levels as described herein. The user can designate his or her desire to enter optional information by clicking a particular area on a screen (or just by entering the optional information).

If the user indicates a desire to entire optional information in operation 1504, then the method proceeds to operation 1506 wherein the user can enter the optional profile (level)

data. The method can then return to operation 1504, wherein the user can continue to enter optional data (or modify data already entered).

From operation 1504, if the user does not wish to enter optional information (or more optional information) then the method proceeds to operation 1508 wherein the method continues. Continuing can mean a number of things, such as the user logging off the account for the time being, or a transaction can be requested using the information entered by the user.

Figure 16:
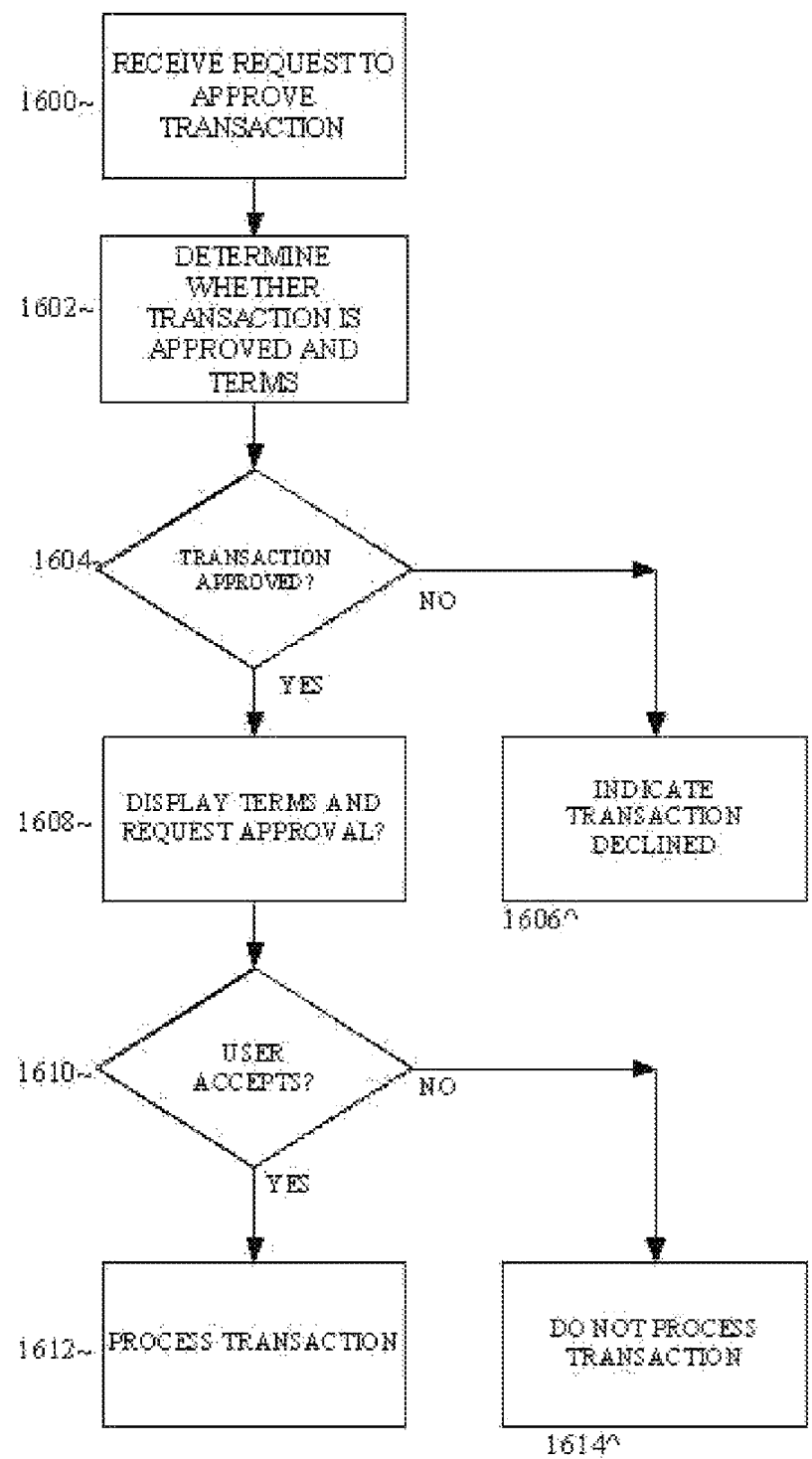
FIG. 16 is a flowchart illustrating an exemplary method of determining financial terms using a profile level, according to an embodiment.

FIG. 16 is a flowchart illustrating an exemplary method of determining financial terms using a profile level, according to an embodiment.

In operation 1600, a request is received by a user to approve a transaction (e.g., loan, advance, factoring request, or any transaction). The user typically does this by using a GUI on his or her web browser that communicates with the cash server (or other server). The user can also use other electronic devices as well (e.g., tablet computer, mobile phone, laptop etc.) to use the system.

From operation 1600, the method proceeds to operation 1602, which determines whether the transaction is approved. This can done by using some or all of the information the user has entered into the system (including optional levels) or provided access to and additional information about the user that can be retrieved from an outside source (e.g., credit reports from credit bureaus), although depending on the algorithms used some information may not be used. If the transaction is approved then the terms of the transaction (e.g., loan/advance amount, interest rate, etc.) is determined as well using some or all of the information the system knows about the user (which includes information the user has entered as well as information that may be retrieved from outside sources (e.g., credit reports from credit bureaus, etc.)). Sources like YODLEE is another outside source that the user can provide the system access to so that the system can login to the YODLEE account and automatically retrieve (and store) any data that the system finds relevant to the user's account.

The determination of whether to approve the transaction and terms can be affected by the optional levels (or information) that the user entered. For example, the loan or advance amounts (if the transaction is approved) may be increased if the user filled out one or more optional levels or provided access to sufficient information to warrant additional cash (e.g., the max loan/advance amount the user would qualify for is $10,000 if the user filled out zero optional levels but would be $15,000 if the user provided access to additional data). Once again, the user might have availability to some amount of information based on minimally required data. For example, if the user sells products on EBAY and generates $2,500 per month in sales, the user may have access to $5,000 (as a loan or advance amount). If the same user also sells on AMAZON and generates an additional $2,500 per month on Amazon, then the user may gain access to $10,000 because the cash provider now recognizes the amount of sales that the user sells across two ecommerce sites. Further, the user may also sell through its own website and generate $10,000 per month doing so. By providing the cash provider with access to data to confirm sales on the users own site, the cash provider may now give access to the user to $25,000 in a loan or advance amount. Please note that the access outlined herein may occur through an automatic system for logging into third party sites including through technology provided by companies such as YODLEE. The user will be incented to provide the optional information (whether referred to herein as levels, categories, sets, etc.) because if they do not they will not receive the incentive that would have been provided to them had they filled out the respective information (although the optional information provided may negatively affect other terms determined by the system (e.g., higher interest rate, etc.) or it may positively affect the other terms as well (depending on the content of the optional information)).

From operation 1602, the method proceeds to operation 1604, which determines whether the transaction was approved in operation 1602. If it was not, then the method proceeds to operation 1606, wherein the user is informed (either instantaneously on the web page or by email) that the transaction was declined.

If the transaction was approved, then the method proceeds to operation 1608, which displays the terms and requests approval (acceptance) from the user. The user can either accept or decline the transaction (by pressing appropriate links on the GUI). If the user declines the transaction, then the method proceeds to operation 1614 wherein the transaction is not processed. Note that funds offered can also be set up as a cash or credit line (similar to a home equity line of credit) where the user is provided with access to an amount of cash and can take a loan or advance from the line up to the total availability. Each amount taken may be considered a loan, advance, transaction amount, or by some other term or terms.

If the user accepts the transaction, then the method proceeds to operation 1612, wherein the transaction is processed by the server, which may include electronically transferring money (a loan or advance) to the user.

In a further embodiment, a seller can request a letter of credit (or letter of cash advance, which should be considered similar during the discussion hereof). A letter of credit is generally known in the art and is a letter/confirmation that a cash provider can generate to guarantee a line of credit for a party without actually loaning or providing the money to the party. In this way, the party can enter into transactions with a third party who (after reviewing the letter of credit) knows that the party has access to the funds guaranteed in the letter of credit. The lender (or cash provider) does not have to lend or advance the money to the party unless the party requests the lender (or cash provider) to lend/advance the money (or pay a third party) up to the amount guaranteed in the letter.

In an embodiment, a letter of credit can be generated in the online auction context. A seller on an e-commerce web set (e-auction, etc.) may need a letter of credit for any business purpose of the seller (e.g., to show another party the seller has the financial means to complete a particular project). The cash server (or other party) can process a request by the seller to generate a letter of credit for the seller. The seller would typically request an amount of credit to be included in the letter of credit, although in an alternative embodiment the cash server would determine the maximum amount of credit to offer the seller and use this amount of credit for the letter of credit.

Figure 17:
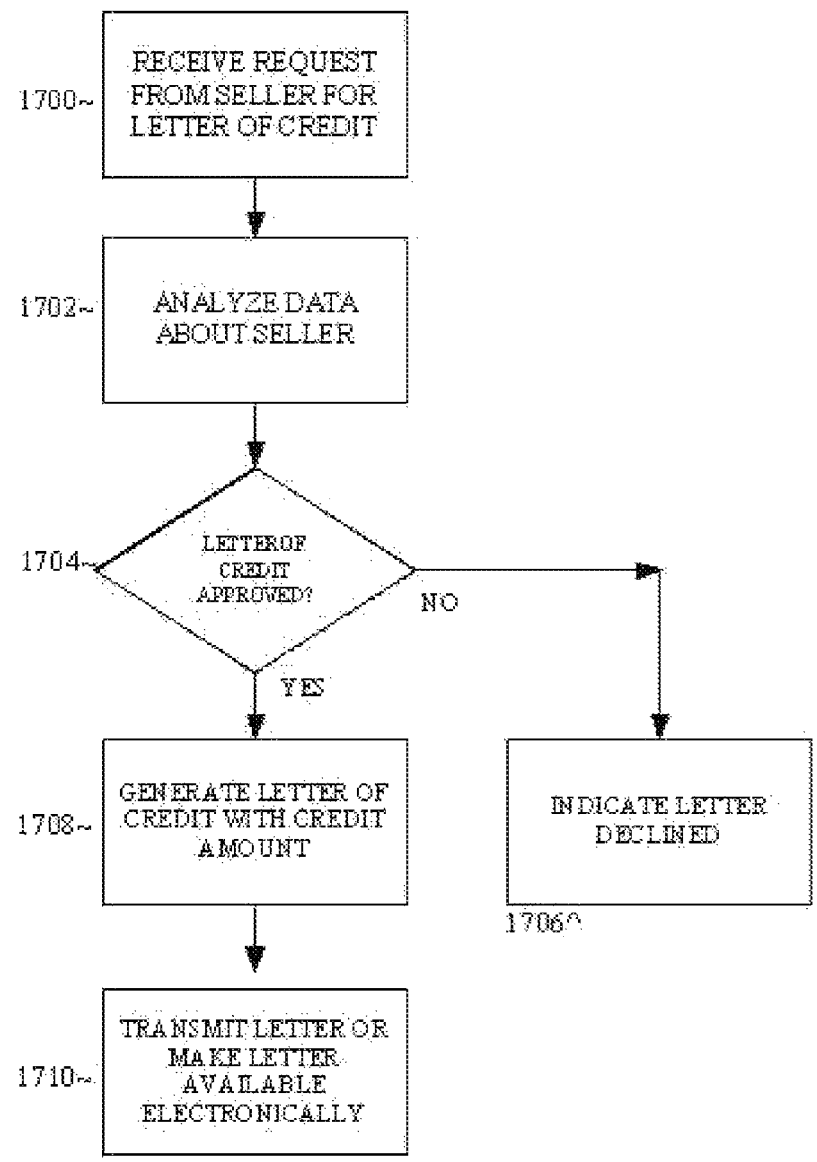
FIG. 17 is a flowchart illustrating an exemplary method of issuing a letter of credit for a seller at an e-commerce web site, according to an embodiment.

FIG. 17 is a flowchart illustrating an exemplary method of issuing a letter of credit for a seller at an e-commerce web site, according to an embodiment.

The method can begin with operation 1700, wherein the seller makes a request to a cash provider (which can be the cash server or other server/party) that the seller desires a letter of credit. The seller would also typically indicate the amount of the letter of credit (although this is not a requirement).

From operation 1700, the method proceeds to operation 1702 wherein the cash provider analyzes available data about the seller and using algorithms, makes a determination whether to approve or deny the letter of credit for the amount requested. This can be done using any of the methods described herein regarding approving a loan. If no amount is specified, then the analysis can be done to determine whether a letter of credit can be generated and only if so, then the maximum credit amount that it can be generated for. Typically, whether the cash provider is deciding to approve a loan or approve a letter of credit would be the same approval process. In a further embodiment, the approval process for a letter of credit might be similar to the loan approval process but with a slight adjustment in the algorithms to reflect a letter of credit as opposed to a loan. For example, since the cash provider may not have to distribute the amount in the letter of credit, the seller may be a little more liberal in the amounts offered.

From operation 1702, the method proceeds to operation 1704, wherein if the determination determined not to issue the letter of credit, then the method proceeds to operation 1606 which indicates to the seller that the letter of credit is denied.

From operation 1704, if the determination determined to approve the letter of credit, then the method proceeds to operation 1708, which generates a letter of credit and the credit amount. If the seller requested (in operation 1700) an amount then this amount would be used in the letter. If the seller did not request an amount, then the amount of credit would be determined in operation 1702 using an algorithm. In one embodiment the seller would be required to specify a requested credit amount. In another embodiment, the seller would not be allowed to specify a requested credit amount and the method would determine the approved amount automatically, and in a further embodiment the seller can optionally choose whether to request a particular credit amount (or let the computer determine the amount which may be higher or lower than the amount the seller would need).

From operation 1708, the method proceeds to operation 1710, which transmits the letter of credit to a party that the seller requests it be transmitted. For example, the letter can be printed in PDF format and can be emailed to a third party. The letter can also be made available electronically on a server using an authentication process (e.g., encryption or other method) so that an interested party can verify that the letter of credit is authentic.

The letter of credit generally means that the guarantor (cash provider) agrees to loan up to an amount indicated in the letter of credit to the seller upon request by the seller (or transfer the money to an agreed upon third party). The letter of credit can have an expiration date so that after a particular date has passed, the cash provider has no further obligations to the seller.

FIGS. 18-26 are screenshots of an example of the "profile building" embodiment, according to an embodiment. FIGS. 18-26 are merely examples, and it can be appreciated that many other implementations/arrangements can be used.

Figure 18:
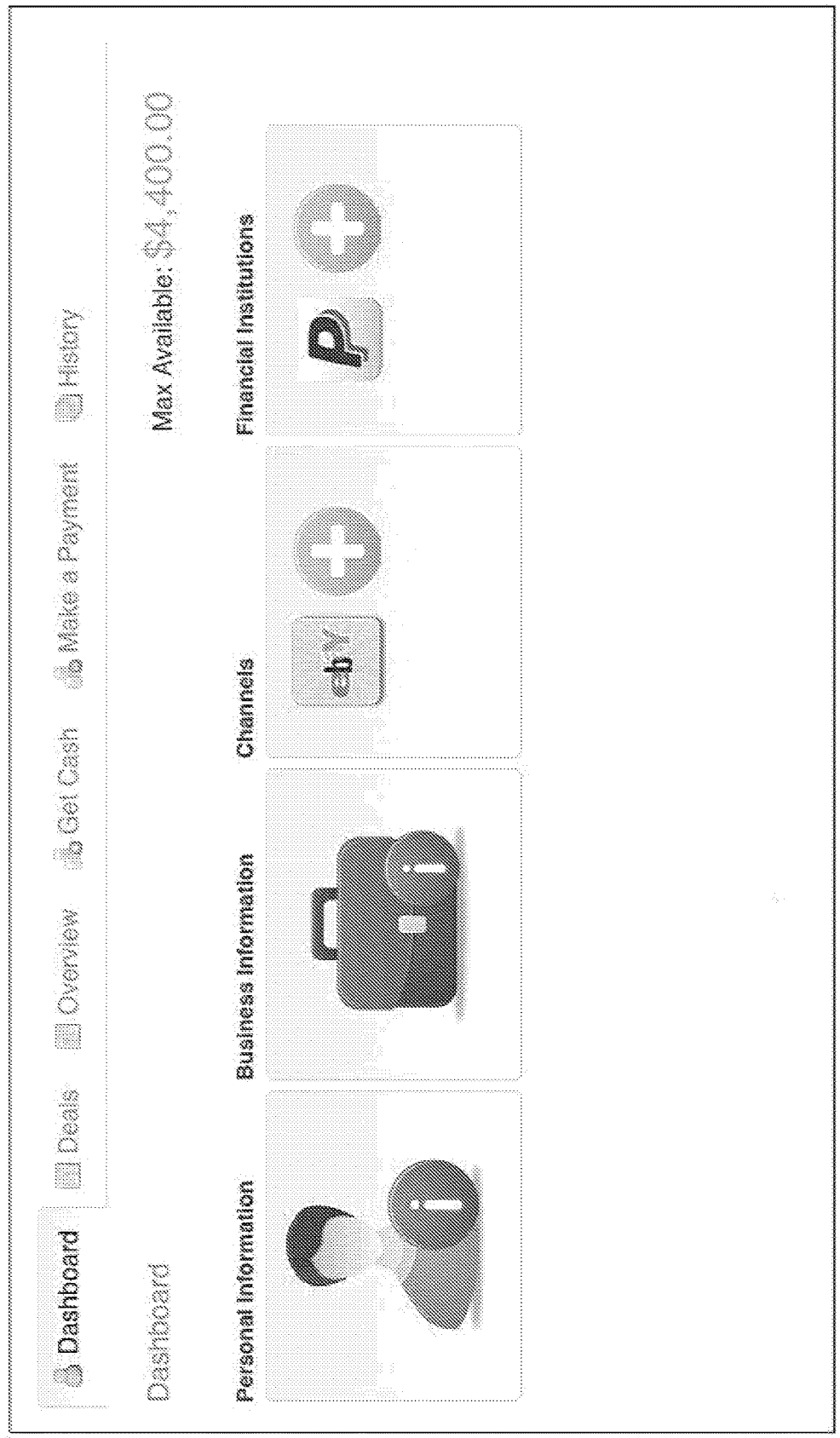

FIG. 18 shows (by virtue of a circle with an 'i' inside) that the user has already entered his personal information and business information, but has not yet entered his channels and financial institutions (as indicated by the circle with the plus sign embedded). The user currently qualifies for $4,400 in cash (the user has already entered some information from a first e-commerce site (e.g., another auction site) which qualifies him for this amount). The user can enter the other information by clicking the boxes with the green circle.

Figure 19:
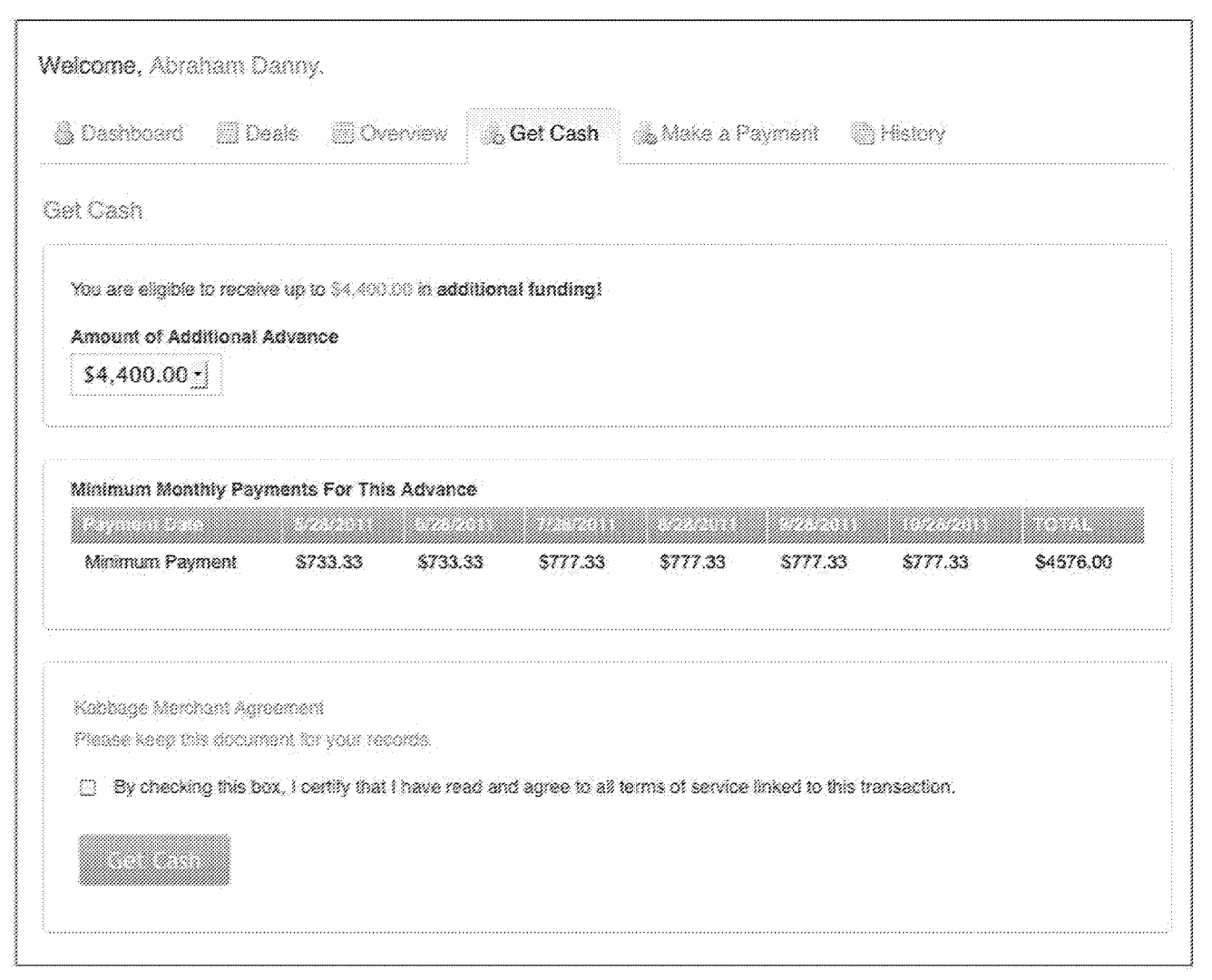

FIG. 19 shows that the user is able to receive $4,400 in cash and can initiated an automatic transfer of this cash (into the user's financial account) by pressing the "get cash" button on the bottom. The screen also shows a payment plan of how the money will be repaid. The repayments can be made automatically by taking each month's respective amount out of the user's financial account (typically the same account the money was placed into and also the same account the user uses to receive payments from sales made on the auction site (e.g., EBAY)).

Figure 20:
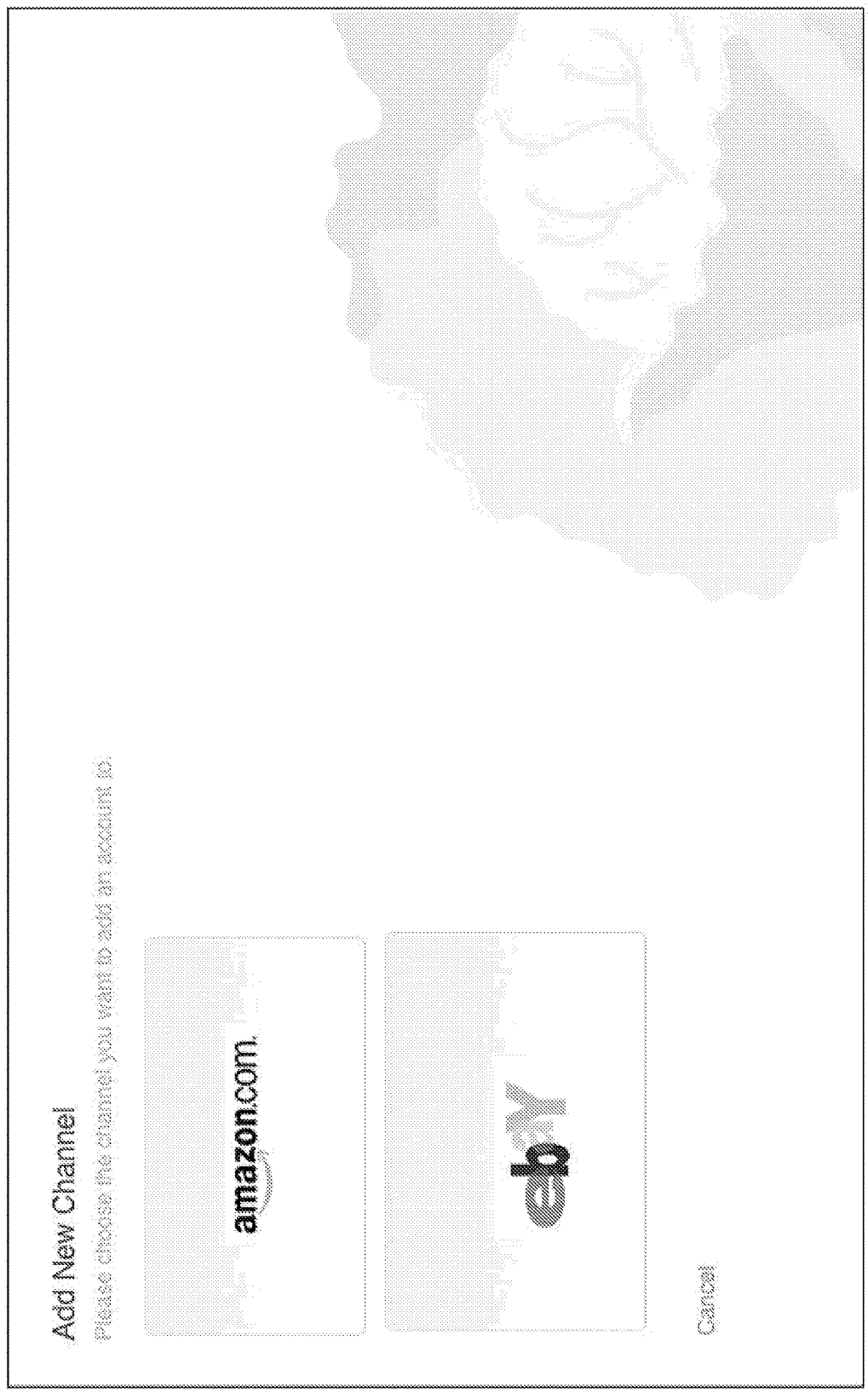

If the user clicks the "channel" box from the first screen shot, the user will be presented with FIG. 20 which allows the user to select a channel to add (e.g., AMAZON.COM OR EBAY) or the user can enter both.

Figure 21:

If the user clicks AMAZON.COM in FIG. 20, then FIG. 21 comes up, which allows the user to enter the name of the bank account that the user uses to receive AMAZON deposits (which can be proceeds from sales made on AMAZON).

Figure 22:

In FIG. 22, the user enters the name of his bank user to receive AMAZON deposits.

Figure 23:
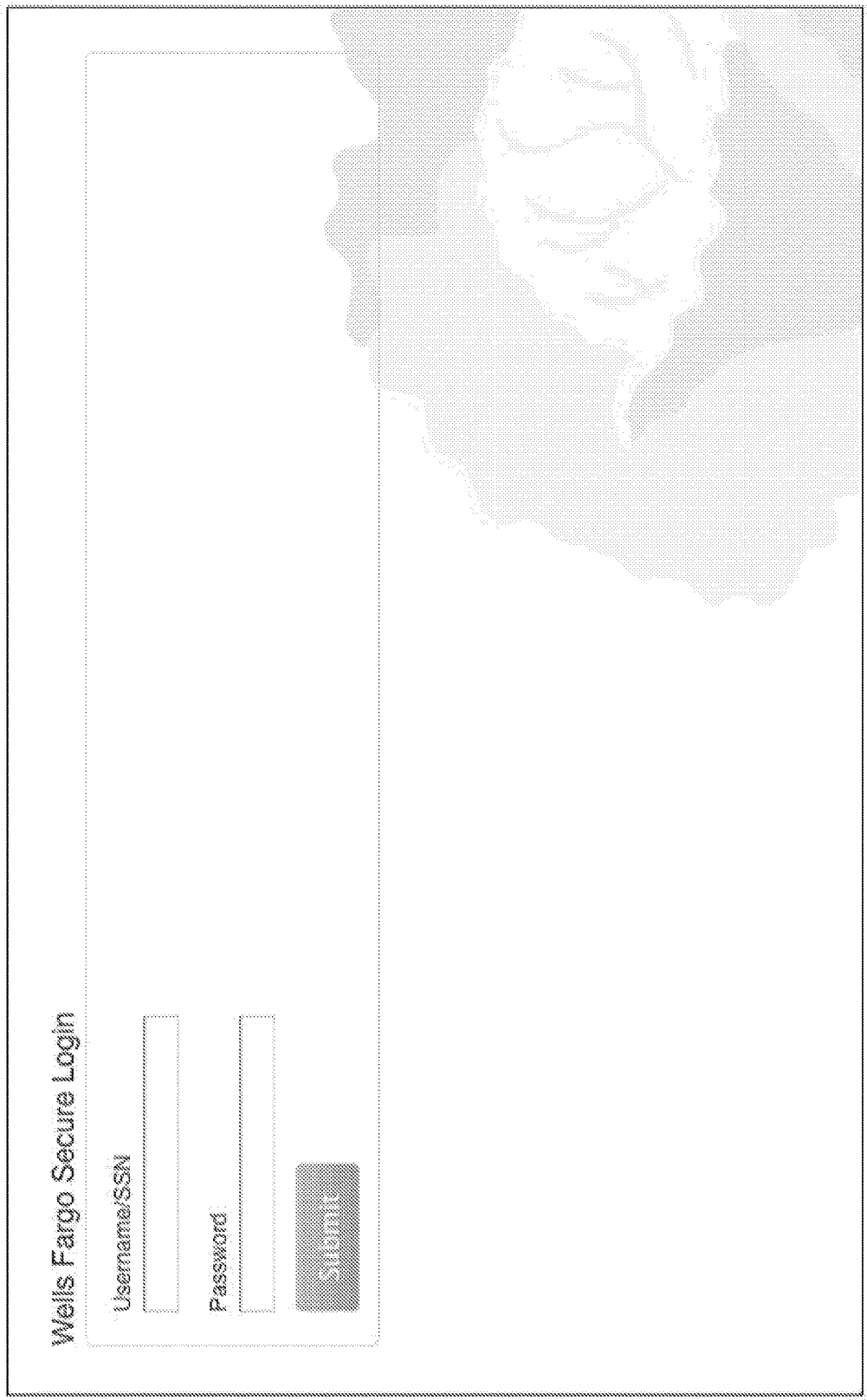

In FIG. 23 (comes after FIG. 22), the user is now prompted to enter his login information for the bank entered in the fifth screenshot (e.g., Wells Fargo).

Figure 24:
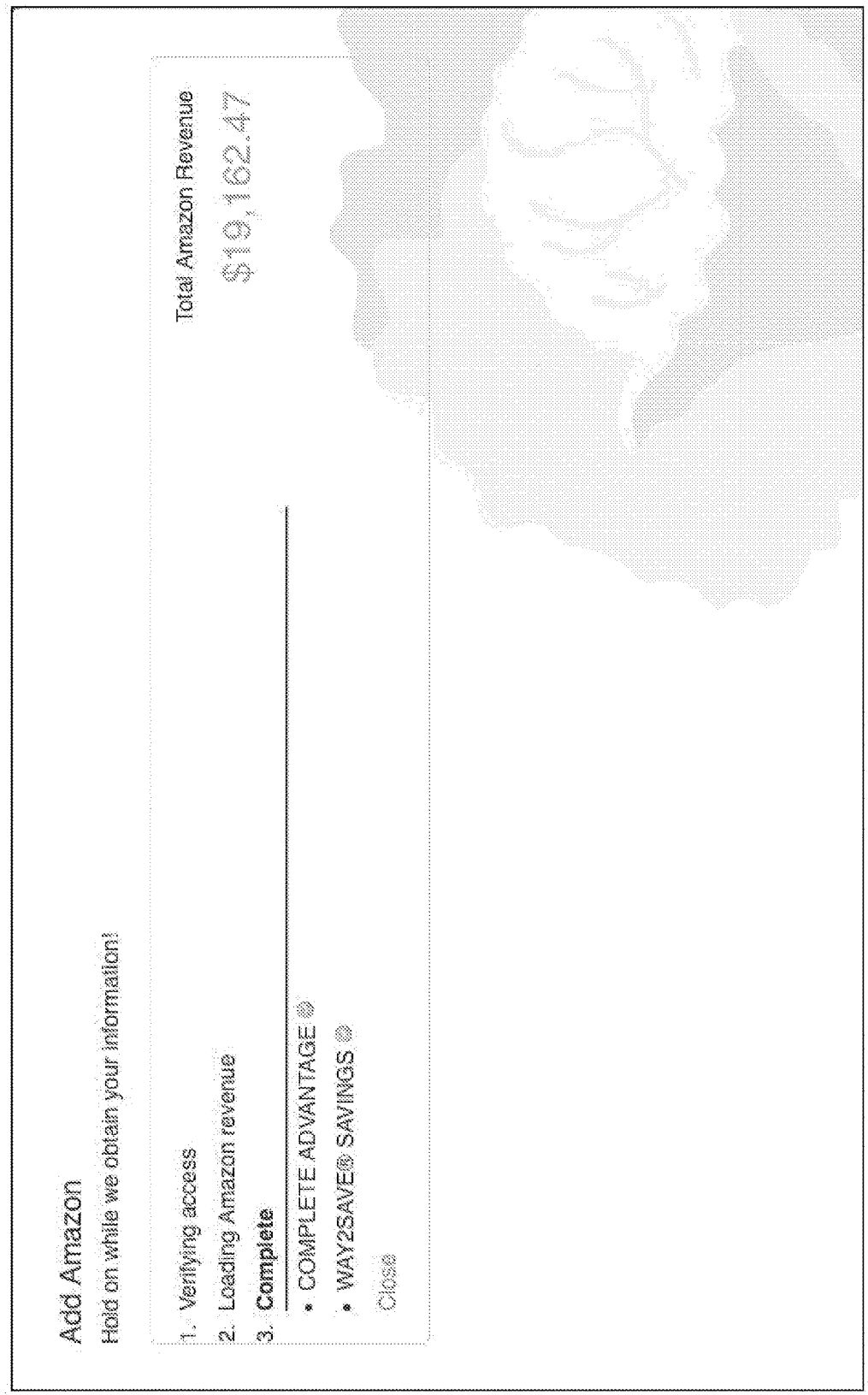

In FIG. 24, the system is retrieving information from AMAZON and the WELLS FARGO account entered about the user. The system has retrieved the users total AMAZON revenue and displays this ($19,162.47).

Figure 25:
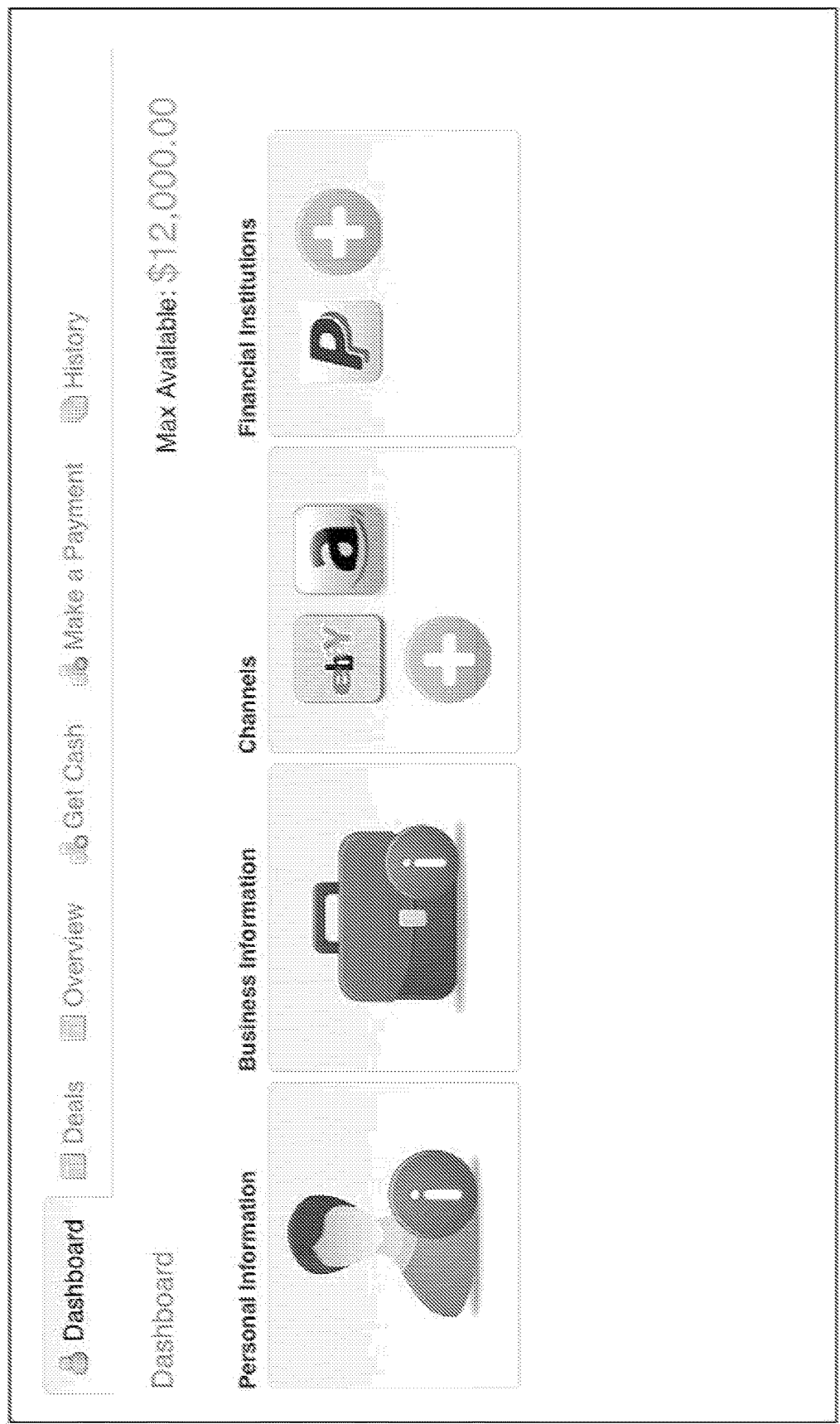

In FIG. 25, the user is now presented with a $12,000 amount of cash that is available for the user to receive if the user wishes (because the user's solid AMAZON sales data has improved the user's borrowing power).

Figure 26:
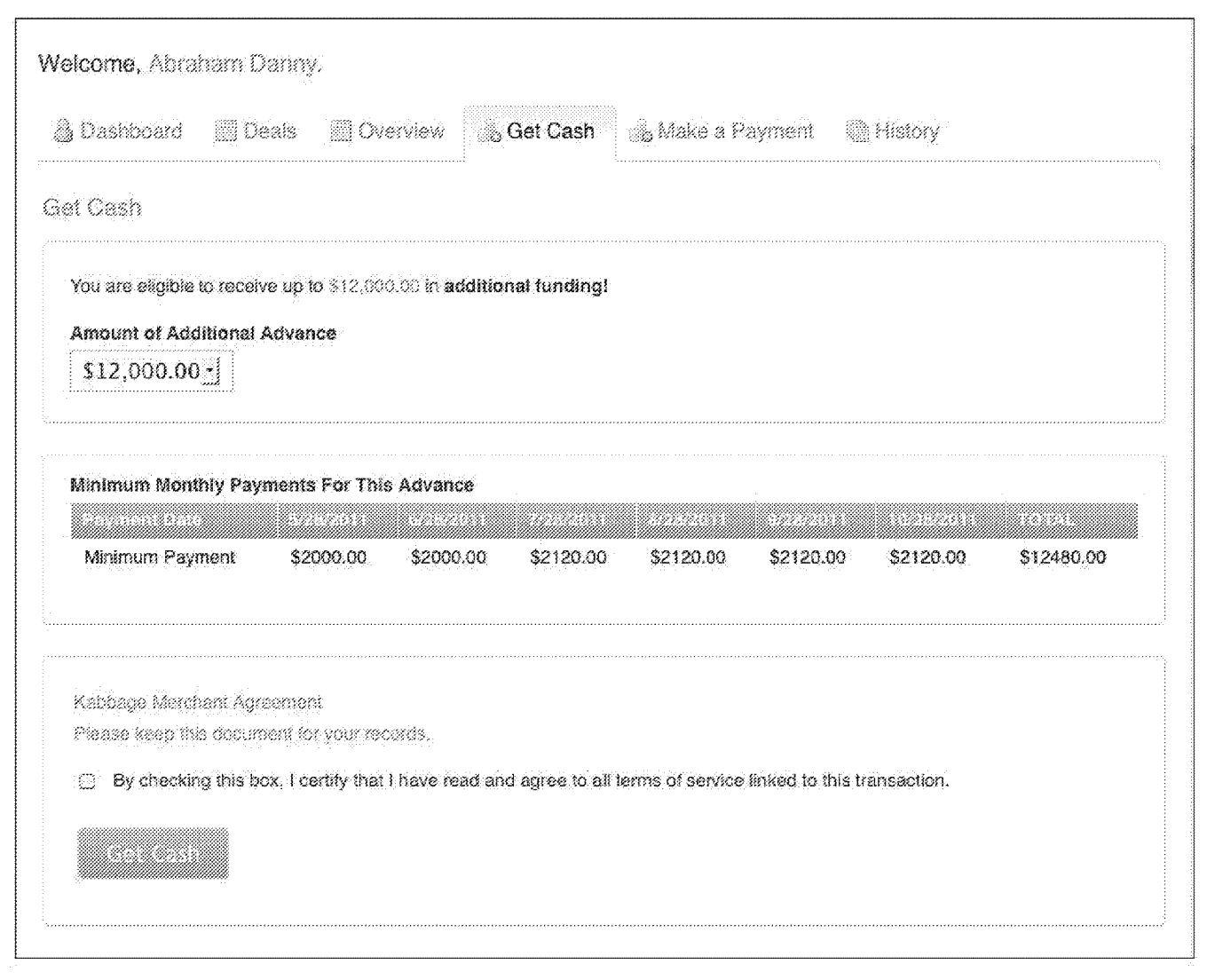

In FIG. 26, the user can now receive the $12,000 by click the "get cash" button on the bottom of the screen and is also presented with a payment plan for repaying the $12,000 (which would typically be repaid automatically as discussed above). Thus, by adding the AMAZON data to the user's account, the user was able to increase the amount of cash available to him. If the user also adds his EBAY account in a similar manner (by clicking E-BAY in FIG. 20 and entering the respective information), and assuming the user's sales on EBAY are high enough, the system would then make additional money (higher than the $12,000) available to the user. This is because the user's sales combined on both EBAY and AMAZON (in addition to the first site which qualified the user for the initial $4,400) combine to give the user the ability to receive more cash (because the user can afford the increased payments). If the user adds his EBAY account but his sales (which are then retrieved automatically) from the EBAY account are not significant (according to the automated analysis) then adding the EBAY account may not result in an increased amount of cash to the user. A simple formula could be used to determine the amount of cash to make available, such as the amount of cash available can be a percentage of total combined sales (across all registered commerce sites) subject to other approvals (such as a credit check) and other factors (which can also increase or decrease the amount of cash available).

Anywhere "auction," "e-auction," "electronic auction" are used herein, other types of commerce sites can be used interchangeably, such as non-auction sites where items can be listed at a fixed price (e.g., CRAIGSLIST, AMAZON Stores, EBAY (non-auctions), PROSTORES, SHOPIFY, etc.).

It is noted that the order of any of the operations described herein can be performed in any order. Any operation described herein can also be optional. All flowcharts herein are not intended to illustrate the only possible implementation, and modifications and deviations can be added which include any feature described herein or based on well established principles. For example, while endless loops may be theoretically possible in some flowcharts, in reality such situations could be handled using common sense approaches. Any embodiments herein can also be stored in electronic form and programs and/or data for such can be stored on any type of computer readable storage medium (e.g. CD-ROM, DVD, disk, etc.). All features can be combined with any other features without limitation, including all features in documents incorporated by reference.

The descriptions provided herein also include any hardware and/or software known in the art and needed to implement the operations described herein. All components illustrated herein may also optionally communicate with any other component (either illustrated/described herein or not described but known in the art).

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

The invention claimed is:

1. An apparatus, comprising:
    a computer connected to a computer communications network;
    the computer configured to:
        detect activation of a loan application submission via input on a graphical user interface of a software application, and in response, display a user interface comprising a first selectable action for a factoring type of repayment and a second selectable action for an advancing type of repayment;
        receive, via the graphical user interface, a submission for a remote application for funds from a party, wherein the submission includes a selection of one of the factoring type of repayment option and the advancing type of repayment option;
        dynamically display a set of input fields, wherein the set of input fields request loan information via an interactive display area of the graphical user interface based on whether the submission includes a selection of the factoring type of repayment or the advancing type of repayment;
        receive loan information input via the dynamically displayed set of input fields within the interactive display area of the graphical user interface and establish periodic payment dates and respective payment amounts to be made by the party automatically using an electronic payment system based on the loan information input received via the display area of the graphical user interface;
        determine that on a payment date of the periodic payment dates an account associated with the party does not contain a respective payment amount; and
        initiate an electronic transfer of funds configured to transfer as much funds from the account to the cash provider as needed to satisfy the respective payment amount, wherein the transfer includes automatically transferring additional funds from the account to the cash provider as the additional funds become available until the respective payment amount is satisfied.

2. The apparatus as recited in claim 1, wherein the party is the seller on an e-commerce web site.

3. The apparatus as recited in claim 2, wherein the account is a merchant account used by the seller on the e-commerce web site.

4. An apparatus, comprising:
    a computer connected to a computer communications network;
    the computer configured to:
        display a user interface comprising a first selectable action for a factoring type of repayment and a second selectable action for an advancing type of repayment;
        receive, via the graphical user interface, a submission for a remote application for funds from a party, wherein the submission includes a selection of one of the factoring type of repayment option and the advancing type of repayment option;
        dynamically display a set of input fields, wherein the set of input fields request loan information via an interactive display area of the graphical user interface based on whether the submission includes a selection of the factoring type of repayment or the advancing type of repayment;
        receive loan information input via the dynamically displayed set of input fields within the interactive display area of the graphical user interface and establish periodic payment dates and respective payment amounts to be made by the party automatically using an electronic payment system based on the input details received via the display area of the graphical user interface;
        determine that on a payment date of the periodic payment dates an account associated with the party does not contain a respective payment amount; and
        initiate an electronic transfer of funds configured to transfer as much funds from the account to the cash provider as needed to satisfy the monetary amount, wherein the transfer includes automatically transferring additional funds from the account to the cash provider as they become available until the monetary amount is satisfied.

5. The apparatus as recited in claim 4, wherein the party is a seller on the e-commerce web site.

6. The apparatus as recited in claim 5, wherein the account is a merchant account used by the seller on the e-commerce web site.

7. An apparatus, comprising:
    a computer connected to a computer communications network;
    the computer configured to:
        display a user interface comprising a first selectable action for a factoring type of repayment and a second selectable action for an advancing type of repayment;
        receive, via the graphical user interface, a submission for a remote application for funds from a seller, wherein the submission includes a selection of one of the factoring type of repayment option and the advancing type of repayment option;
        dynamically display a set of input fields, wherein the set of input fields request loan information via an interactive display area of the graphical user interface based on whether the submission includes a selection of the factoring type of repayment or the advancing type of repayment;
        receive loan information input via the dynamically displayed set of input fields within the interactive display area of the graphical user interface and establish periodic payment dates and respective payment amounts, and an account associated with the seller, based on the input details received via the display area of the graphical user interface;

wait until a periodic payment date having a respective payment amount;

determine a repayment amount, wherein the repayment amount equals the funds received from the designated customer(s) for a respective period except if the funds received from the designated customer(s) for the respective period exceed the respective payment amount then the repayment amount equals the respective payment amount; and automatically initiate without human intervention an electronic transfer of funds of the repayment amount from the account to the cash provider.

8. The apparatus as recited in claim 7, wherein the computer is further configured such that the account is a PAYPAL account.

9. The apparatus as recited in claim 7, wherein the computer is further configured such that the seller selects the periodic payment dates.

10. The apparatus as recited in claim 1, wherein the computer is configured to display the graphical user interface in response to selection of a link on a website associated with the software application.

11. The apparatus as recited in claim 1, wherein the computer is configured to dynamically display a field for customer identification via the graphical user interface in response to selection of the factoring type of repayment.

12. The apparatus as recited in claim 1, wherein the computer is configured to dynamically display a day field via the graphical user interface in response to selection of the advancing type of repayment.

13. The apparatus as recited in claim 4, wherein the computer is configured to display the graphical user interface in response to selection of a link on a website associated with the software application.

14. The apparatus as recited in claim 4, wherein the computer is configured to dynamically display a field for customer identification via the graphical user interface in response to selection of the factoring type of repayment.

15. The apparatus as recited in claim 4, wherein the computer is configured to dynamically display a day field via the graphical user interface in response to selection of the advancing type of repayment.

16. The apparatus as recited in claim 7, wherein the computer is configured to display the graphical user interface in response to selection of a link on a website associated with the software application.

17. The apparatus as recited in claim 7, wherein the computer is configured to dynamically display a field for customer identification via the graphical user interface in response to selection of the factoring type of repayment.

18. The apparatus as recited in claim 7, wherein the computer is configured to dynamically display a day field via the graphical user interface in response to selection of the advancing type of repayment.

* * * * *